(12) United States Patent
Wheeler et al.

(10) Patent No.: US 9,339,054 B2
(45) Date of Patent: May 17, 2016

(54) SHELF STABLE FRIED PRODUCT AND PROCESS FOR CREATING THE SAME

(75) Inventors: Janet Olson Wheeler, Anacortes, WA (US); Deborah Dihel, Richland, WA (US); Kevin Mellor, Kennewick, WA (US); Jeffrey Schneider, Benton City, WA (US); Kristin Mills, Benton City, WA (US); Roger Samoray, Kennewick, WA (US); Moses Sanchez, Pasco, WA (US)

(73) Assignee: ConAgra Foods RDM, Inc., Omaha, NE (US)

( * ) Notice: Subject to any disclaimer, the term of this patent is extended or adjusted under 35 U.S.C. 154(b) by 1032 days.

(21) Appl. No.: 12/473,828

(22) Filed: May 28, 2009

(65) Prior Publication Data

US 2010/0015298 A1 Jan. 21, 2010

Related U.S. Application Data

(60) Provisional application No. 61/082,050, filed on Jul. 18, 2008.

(51) Int. Cl.
| | |
|---|---|
| A23L 1/216 | (2006.01) |
| A23L 1/217 | (2006.01) |
| A23B 7/00 | (2006.01) |
| A23L 1/00 | (2006.01) |
| A23L 1/01 | (2006.01) |
| A23L 1/212 | (2006.01) |

(52) U.S. Cl.
CPC .............. *A23L 1/0047* (2013.01); *A23L 1/0107* (2013.01); *A23L 1/212* (2013.01); *A23L 1/217* (2013.01); *A23L 1/2125* (2013.01)

(58) Field of Classification Search
CPC ....... A23L 1/217; A23L 1/212; A23L 1/2125; A23L 1/0047; A23L 1/0107
USPC .......................................................... 426/102
See application file for complete search history.

(56) References Cited

U.S. PATENT DOCUMENTS

| | | | |
|---|---|---|---|
| 2,827,938 A | | 3/1958 | Adamson |
| 3,962,355 A | | 6/1976 | Yamazaki et al. |
| 4,579,743 A | * | 4/1986 | Hullah .......................... 426/262 |
| 4,585,660 A | | 4/1986 | Sugisawa et al. |
| 4,828,859 A | | 5/1989 | Imai |
| 4,985,262 A | * | 1/1991 | Camire et al. ................ 426/302 |
| 5,142,968 A | | 9/1992 | Caron et al. |
| 5,211,098 A | | 5/1993 | Mendenhall |
| 5,486,369 A | | 1/1996 | Mason et al. |
| 5,698,248 A | * | 12/1997 | Lonergan ........................ 426/99 |
| 5,972,397 A | * | 10/1999 | Durance et al. ............... 426/242 |
| 6,001,411 A | | 12/1999 | Kester et al. |
| 6,136,358 A | | 10/2000 | Minelli et al. |

(Continued)

OTHER PUBLICATIONS

International Search Report mailed Jul. 13, 2009, in PCT/US09/45461.

*Primary Examiner* — Lien T Tran
*Assistant Examiner* — Jeffrey Mornhinweg
(74) *Attorney, Agent, or Firm* — Ryan T. Grace; Advent, LLP

(57) ABSTRACT

A shelf stable fried product and a process for creating a shelf stable fried product is disclosed. Aspects include a process for managing fat migration, moisture migration, and cell degrading of a food product during frying. Aspects further include a resulting shelf stable food product that includes a crispy and/or crunchy texture and a desirable fat distribution.

23 Claims, 3 Drawing Sheets

(56) References Cited

U.S. PATENT DOCUMENTS

| | | | |
|---|---|---|---|
| 6,290,999 B1 * | 9/2001 | Gerrish et al. | 426/302 |
| 6,514,554 B1 | 2/2003 | Minelli et al. | |
| 6,703,065 B2 * | 3/2004 | Villagran et al. | 426/637 |
| 2003/0017253 A1 | 1/2003 | Villagran et al. | |
| 2003/0170355 A1 | 9/2003 | Glazier et al. | |
| 2004/0115321 A1 | 6/2004 | Tricoit et al. | |
| 2004/0224064 A1 | 11/2004 | Shepherd et al. | |
| 2006/0177544 A1 * | 8/2006 | Sloan | 426/102 |
| 2007/0141227 A1 | 6/2007 | Boudreaux et al. | |
| 2007/0265518 A1 | 11/2007 | Young et al. | |

* cited by examiner

SHELF STABLE FRIED PRODUCT AND PROCESS FOR CREATING THE SAME

CROSS-REFERENCE TO RELATED APPLICATION

This application claims the benefit of U.S. Provisional Patent Application 61/082,050 filed on Jul. 18, 2008.

BACKGROUND

The aesthetic properties of shelf stable fried food products are a contributor to consumer appeal. Prior processes for creating shelf stable fried food products result in a less desirable shelf stable food product.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to a shelf stable fried product. Aspects of the disclosure also pertain to a process for managing fat migration, moisture migration, and product cell degradation. The shelf stable fried product includes advantageous color, flavor, texture, shelf stability, fat distributions and/or appearance.

DRAWINGS

DETAILED DESCRIPTION

Figure 1:
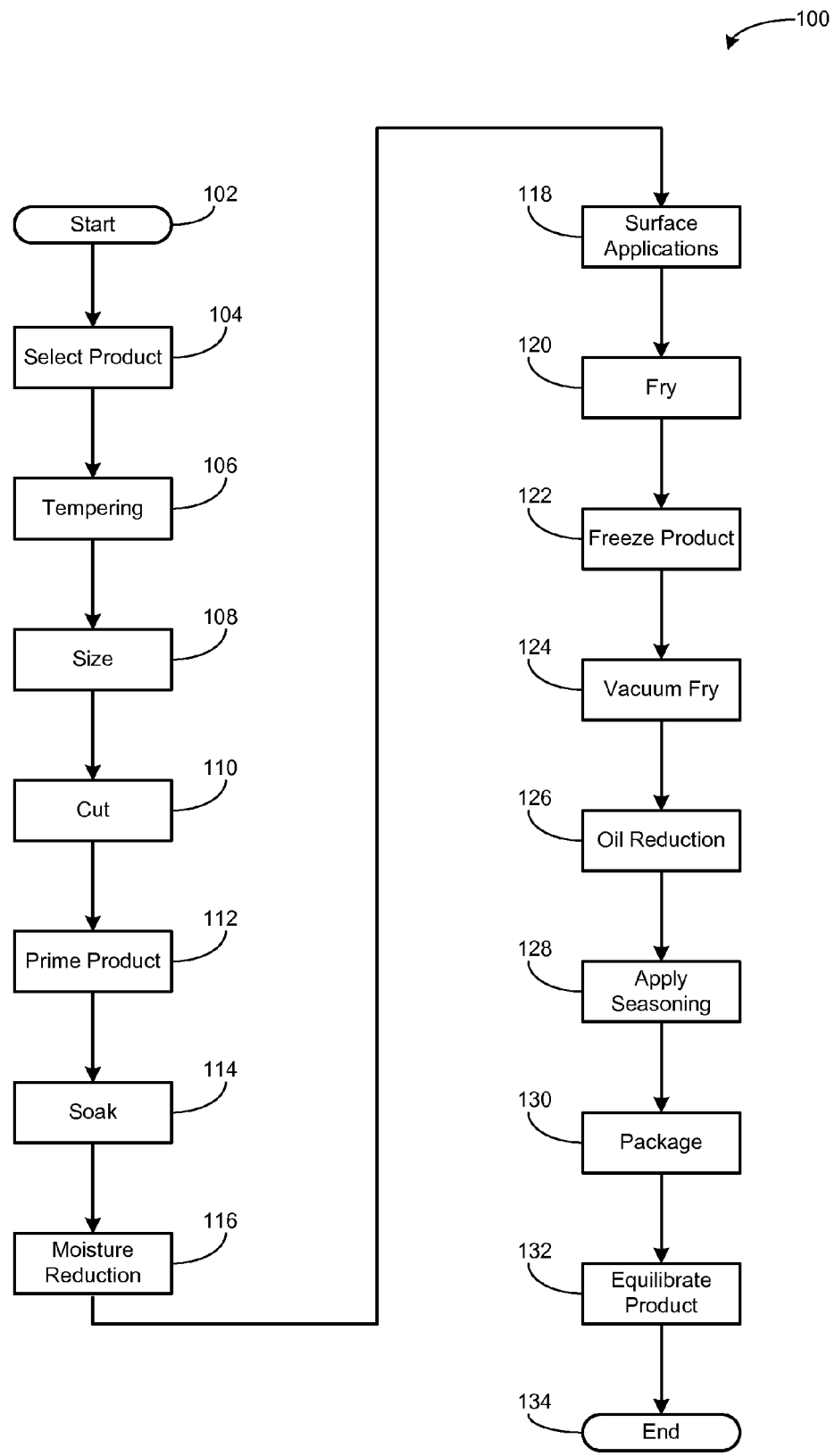
FIG. 1 is an exemplary operational flow diagram illustrating an exemplary process for producing a shelf stable fried product.

Shelf stable fried food products provide consumers with a quick and easy snack. As indicated herein, fried food products can be shelf stable and can be utilized or eaten by the consumer without any preparation, such as thawing or cooking. As further indicated herein, shelf stable fried food products can include whole and/or whole pieces of fruits and/or vegetables, which are ideal for on-the-go snacking.

Prior processes have been utilized to create chip type products and to create intermediate products such as fries that are to be cooked by a consumer for consumption. Prior processes degrade cell structures of the product and fail to manage fat migration and moisture content in the product. As more fully set forth herein, fat migration can include the movement of fat and/or oil from the interior toward the exterior and can include the movement of fat and/or oil outside of the product into the product. Moisture migration can include the movement of moisture from the interior toward the exterior and can include the movement of moisture outside of the product into the product. Degraded cell structures can include ruptured cells which form gaps, cracks, channels, and/or pockets in the internal cell matrix of the product. When cell structures are degraded, the resulting product has a less desirable bite and fat and/or moisture uncontrollably migrates in the product. Ruptured cell structures facilitate the movement of fat into the product and also provide inconsistent channels for moisture migration during frying and/or vacuum frying. The inconsistent migration of moisture out of the product can cause an explosive effect and blow surface applications off of the product during frying and/or vacuum frying. Unmanaged moisture migration also reduces the time window when fat is hindered from migrating into the product through a pressure differential created during frying and/or vacuum frying when moisture/steam exits the product. Such fat migration, fat concentrations, degraded cell structures, and moisture migration degrades the texture of the final product, removes flavor components from the product, and causes inconsistencies in product batches.

Aspects of the disclosure pertain to shelf stable fried product and a process for managing fat migration, moisture migration, and the internal product matrix to produce a shelf stable fried product having fat distributions as indicated herein. The term "aesthetic" is used herein to refer to the color, flavor, appearance, shelf stability, fat distribution and/or texture of a fried product. Aspects include a process for adding visual enhancements, managing fat migration, managing moisture migration, and managing cell degrading of a product during frying and/or vacuum frying. The moisture management processes can be used to manage the shelf stability of the product, increase the adhesion of surface applications, manage fat migration in the product, and decrease staling over time to preserve texture. The fat management can include processes for causing a product to include a desirable fat distribution in the product, provide a desirable texture, and resist staling over time. The fat distribution and moisture content as set forth below allows flavor components to remain in the product and results in a desirable texture. The management of cell structures also results in an enhanced texture of the end product by controlling the channels in which moisture and fat can migrate. Aspects further include a resulting shelf stable product that includes a crispy and/or crunchy texture with a beneficial fat distribution. The crispy and/or crunchy texture, the optional cut of the product, the fat distribution, the moisture content, the flavor components, and the attributes of surface applications are aesthetically pleasing to end consumers, resist staling, and reduce breakage issues during packaging and shipping of the shelf stable product.

As more fully set forth below, aspects of the disclosure can include product tempering. In general, tempering the product has an affect on the appearance of the final product, and can have an affect on fat management and moisture management via uniform surface application adhesion, which ultimately improves the texture of the final product. If a product is cut during the process below, tempering provides for a smooth cut of the product. The smooth cut of the product allows for a visually appealing (less jagged) appearance, facilitates adhesion of surface applications, and reduces the surface area of the product via reduced jagged edges. Reducing surface area reduces the area through which fat and moisture have an opportunity to migrate, which causes the fat uptake of the product. Surface application adhesion provides an impediment around the product to help manage fat and moisture migration during frying and/or vacuum frying. The management of fat and moisture migration during the frying and/or vacuum frying operation affects the aesthetic and textural properties of the final product. Final shelf stable products with managed fat migration, moisture migration, and uniform batter adhesion, via the tempering operation set forth herein, have a crispy and/or crunchy texture.

As more fully set forth below, aspects of the disclosure can also include a product priming operation. In general, priming the product has an affect on fat management, moisture management, product cell matrix, color, and ultimately the texture of the final product. The priming operation promotes product surface preparation and can manage the degrading of internal cell structures of the product. In aspects of priming, the surface portion of the product can be gelatinized and carbohydrates near the surface of the product are concentrated. During the priming operation, complex carbohydrates near the surface of the product can be concentrated and simple carbohydrates near the surface can be removed from the product. The gelatinized surface portion and the concentration of the complex carbohydrates form a primed portion of the product. The primed portion also can facilitate surface application adhesion while managing the degrading of the product's internal cell structure during frying and/or vacuum frying. The primed portion can also be denser via the concentration of complex carbohydrates. As such, the primed portion can provide a portion for diffusing steam as steam exits the product during the frying and/or vacuum frying processes. During frying and/or vacuum frying, moisture turns to steam and exits the product from a pressure differential. When the steam encounters the primed portion and/or surface application, the steam is diffused. The diffused steam provides for a managed exit of steam from the product. The managed exit of steam is less likely to blow surface applications off the product during frying and/or vacuum frying. The diffused exit of steam also reduces the formation of steam channels in the product which cause a volatile exit of steam and provides a path for fat to migrate into the product during frying and/or vacuum frying. The management of fat and moisture migration during the frying and/or vacuum frying operation affects the aesthetic properties of the final product. Final shelf stable products with managed fat, managed moisture, and managed cell matrix, via the priming operation herein, have a crispy and/or crunchy texture.

As more fully set forth below, aspects of the disclosure can also include a moisture reduction operation. In general, the moisture reduction operation has an affect on the management of fat and/or moisture migration and ultimately the texture of the final product. Moisture reduction operations remove surface moisture from the product via heat drying, atmospheric drying, and/or drip moisture reduction. The water removal prepares the product for surface applications. The removal of the water improves the adhesion of surface applications and reduces blow off during frying and/or vacuum frying. In some aspects with starch based products, moisture reduction can gelatinize the surface of the product to create a tacky layer on the product and can concentrate complex carbohydrates near the surface. This tacky layer increases the adhesion of surface applications to allow for proper coverage of the product. The reduction of surface water prevents the surface application from "sliding off" the product and enables the surface application to maintain its solid percentage on the product. The reduction of surface water also reduces water from being trapped under the surface application, which will volatilize into steam in the frying and/or vacuum frying process and blow the surface application off the product. Proper surface application adhesion provides an impediment around the product to help manage fat and moisture migration during the frying and/or vacuum frying processes. The management of fat and moisture migration during the frying and/or vacuum frying operations affects the aesthetic properties of the final product. Final shelf stable products with managed fat and moisture migration, via the moisture reduction operation set forth herein, have a crispy and/or crunchy texture.

As more fully set forth below, aspects of the disclosure can further include a surface application operation. In general, the surface application facilitates desirable color, flavor, appearance, texture, and fat impediment properties through the viscosity of the surface application to manage fat and moisture migration associated with the product. If not enough surface application and/or a surface application with too low of a viscosity is utilized, the finished product will have too little color, flavor, appearance of particulate, and more fat will be absorbed during the frying and/or vacuum frying processes which can have a negative affect on the texture and aesthetics of the fried product. The management of fat and moisture migration during the frying and/or vacuum frying operation affects the aesthetic and textural properties of the final product. Final shelf stable products with managed fat and moisture migration, via the surface application operation set forth herein, have a crispy and/or crunchy texture, enhanced color, improved flavor, and an optimized appearance.

As more fully set forth below, aspects of the disclosure can also include a fry operation. In general, setting the surface application during frying forms an initial impeding skin around the product to help manage fat and moisture migration during frying and/or vacuum frying. During frying, moisture is forced out of the product via steam. The steam has an outward force which impedes the movement of fat into the product as the steam exits. The exiting of the steam is managed via the surface application, the management of the cell structure matrix of the product, and the formation of the primed portion. For example, the internal cell matrix can be managed to mitigate the formation of pockets, fissures, and channels in the product which will cause an explosive exit of steam as opposed to a diffused managed exit of steam. The management of the steam provides a generally consistent outward force from the steam which reduces inconsistent fat migrations into the product. The management of fat migration during the frying operation affects the aesthetic properties of the final product. Final shelf stable products with managed fat migration, via the fry operation set forth herein, have a crispy and/or crunchy texture which is more aesthetically pleasing to end consumers.

As more fully set forth below, aspects of the disclosure can also include a freeze operation for some products. In general, the freezing manages the structures of the cells in the product by reducing cell ruptures during frying and/or vacuum frying. Furthermore, managed cell structures facilitate the management of fat migration in the product. A freeze also solidifies fat on the outside of the product. The faster the freeze, the more fat that is solidified on the outside of the product. As the frozen fat thaws on the surface of the product during frying and/or vacuum frying, fat is impeded from entering the product. Moreover, quickly freezing the product manages moisture in the product. The quick freeze causes a distribution of small ice crystals in the product. When the product is fried or vacuum fried, the small ice crystals vaporize into steam. The steam is defused from the product to cause an outward force from the steam via the primed portion and/or the surface application. This outward force impedes the migration of oil into the product across the surface of the product. From the distribution and size of the ice crystals, steam is diffused through the product as opposed to the steam being localized through large ice crystal formation and channels in the product cell matrix.

The formation of ice crystals also provides structural support for the internal product matrix as the product is fried and/or vacuum fried. When a product is fried and/or vacuum fried, the product thaws from the outside of the product to the inside of the product. The thawing changes the ice into liquid. Then the liquid is turned to steam. The transformation from ice to steam takes more energy and time than a transformation from liquid to steam. As such, internal cells of the internal product matrix are structurally supported for a longer time via the ice crystals of the internal cells. This allows time for the heat to fix the structural product matrix before it collapses from the exit of steam. Accordingly, freezing the product as provided herein provides a window of time when fat migration into the product is impeded. Freezing also sets the surface application which creates an impediment for preventing the absorption of fat during frying and/or vacuum frying. Freezing the product further facilitates the fixation of the internal product matrix and reduces collapsing. Freezing the product further allows for the product to remain free flowing, which minimizes the formation of clumps in the frying and/or vacuum frying process that creates an undesirable appearance and texture in the finished product. Therefore, freezing manages fat and moisture migration and improves the resulting texture of the shelf stable product.

As more fully set forth below, aspects of the disclosure can also include a vacuum frying operation. The parameters utilized to vacuum fry the product are calculated so that vacuum frying mitigates fat migration, mitigates excess moisture, mitigates cell degradation, mitigates oil degradation, and mitigates the degradation of desired nutrients, colors and flavors. The other operations set forth herein have an affect on the outcome of the vacuum frying operation. Tempering the product results in enhanced surface application adhesion. The enhanced surface application adhesion reduces batter blow off during vacuum frying and provides an impediment for diffusing steam. The reduced batter blow off reduces the paths through which fat can migrate into the product. Priming the product creates a priming portion. The priming portion can include a tacky surface which promotes batter adhesion. The enhanced surface application adhesion reduces batter blow off during vacuum frying and provides a portion for steam diffusion. The reduced batter blow off reduces the paths through which fat can migrate into the product. The primed portion can also include concentrated carbohydrates. The concentrated primed portion diffuses steam as it exits the product during vacuum frying. The diffused steam reduces the force of the steam and mitigates surface application blow off. The diffused steam also provides an outward force from the product sufficient to counter the force of fat migration into the product. Moisture reduction results in enhanced surface application adhesion which reduces fat uptake during frying. The enhanced surface application adhesion reduces batter blow off during vacuum frying and provides an impediment for steam diffusion. The reduced batter blow off reduces the paths through which fat can migrate into the product. Frying results in a set surface application which reduces fat uptake during frying. Freezing provides for small ice crystals and a managed internal cell structure, which provides a window for reduced fat migration into the product during vacuum frying via the steam exiting the product.

As more fully set forth below, aspects of the disclosure also pertain to a shelf stable fried product that includes a whole cut of vegetable or fruit. The product includes an inwardly and an outwardly portion. The product includes the fat distributions as more fully set forth below. The shelf stable product includes a moisture content and water activity for shelf stability. The shelf stable fried product has a crispy and crunchy texture and a resistance to staling. The shelf stable fried product can be packaged to facilitate on-the-go snacking where consumers are not required to cook, thaw, heat or otherwise further prepare the product prior to consuming the product from the package.

A. Methods And Processes

FIG. 1 is an exemplary operational flow diagram of an exemplary process for managing fat migration, managing moisture migration, and managing cell degradation to produce an aesthetic shelf stable fried product. Operational flow 100 is depicted in FIG. 1 as a series of operations. As indicated herein, the order of the operations can be rearranged or reconfigured. As also indicated herein, certain operations can be eliminated from the operational flow 100 depending on the starting product and the desired end product. Operations are exemplarily indicated. As indicated herein, certain operations can be decision operations which may or may not be utilized in operation 100 depending on the starting product and the level of fat, moisture, and product matrix management desired. Operations associated with operational flow 100 can be automatic in response to an event, manual in response to an operator determination, operator driven, software driven, and/or equipment driven. Operational flow 100 discloses several operations that have an affect on fat migration, moisture migration, and product matrix in a fried and/or vacuum fried product. Each individual operation can have a sufficient affect on fat, moisture, and product matrix management to improve the aesthetic properties of an end product. The full combination of operations can have a sufficient affect on fat, moisture, and product matrix management to improve the aesthetic properties of an end product. Also, various combinations of operations can have a sufficient affect on fat, moisture, and product matrix management to improve the aesthetic properties of an end product. The combinations and sub-combinations are more fully set forth below.

1. Product Selection

Operational flow 100 begins at start operation 102 and continues to operation 104 where a raw product is selected. The term "product" is used herein to refer to a raw food item, a starting food item, an ending food item, and/or a food item at any point in operational flow 100. Any type of vegetable or fruit can be used in association with operational flow 100. For example, the raw product may include a potato. Examples of potatoes include, but are not limited to, Russet potatoes, Goldrush potatoes, White potatoes, Red potatoes, Yellow potatoes, Ruby potatoes, Australian potatoes, Yukon potatoes, Peruvian Blue potatoes, Superior potatoes, Kennebec potatoes, Katchdin potatoes, New potatoes and Sweet potatoes. Other examples of raw products include any type of onion. Other types of raw products may include any type of fruit. Still other examples of raw products may include avocado, beets, broccoli, carrots, cauliflower, corn, beans, peppers, pepperoncini, cucumber, pickle, peas, squash and zucchini. Again, the above examples are not meant to be an exhaustive list, but a list of a few examples of raw products that may utilize the aforementioned methods and processes. The disclosure herein sets forth several examples associated with potatoes, sweet potatoes, and onion. The examples are included to show a spectrum that includes products with a high starch content (for example a potato) to products with a high moisture content (for example onion and fruits). The examples are also included to show a spectrum that includes products with high complex carbohydrates (for example potato) to products with high simple carbohydrates (for example onion and fruits). These examples are not meant to limit the scope of the disclosure. In light of the teachings herein, a person of skill in the art will understand that a myriad of fruits and vegetables of the spectrum may utilize the processes. The product selected can go through a wash, sort, and/or peel step. Products can be sorted for a specific size or other attribute to give a unique appearance such as a specific size or type of cut.

2. Tempering

From select operation 104, operational flow 100 can optionally continue to operation 106. At operation 106, it can be decided whether to temper the selected product. Depending on the starting raw product, the product can be tempered. For example, potatoes, sweet potatoes, fruits, and other vegetables can utilize tempering 106. As another example, onions, sweet potatoes, fruits, and other vegetables may not utilize tempering 106. If it is decided not to temper the product, operational flow 100 continues to operation 108 without tempering 106.

Tempering operation 106 can include heating the product at a temperature of about 100° F. to 155° F. for about 15 to 60 minutes. The product can be tempered for about 15 to 20 minutes, about 20 to 25 minutes, about 25 to 30 minutes, about 30 to 35 minutes, about 35 to 40 minutes, about 40 to 45 minutes, about 45 to 50 minutes, about 50 to 55 minutes, and about 55 to 60 minutes, inclusive. The product can be tempered at a temperature of about 100° F. to 105° F., about 105° F. to 110° F., about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., and about 150° F. to 155° F., inclusive.

As one non-limiting example associated with a potato product, a potato can be tempered at a temperature of about 100° F. to 155° F. for about 30 to 40 minutes. In one aspect, the potato is tempered at a temperature of about 130° F. to 140° F. The potato can be tempered at a temperature of about 100° F. to 105° F., about 105° F. to 110° F., about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., and about 150° F. to 155° F., inclusive. The potato can be tempered for about 30 minutes, about 31 minutes, about 32 minutes, about 33 minutes, about 34 minutes, about 35 minutes, about 36 minutes, about 37 minutes, about 38 minutes, about 39 minutes, and about 40 minutes.

As one non-limiting example associated with a sweet potato or an onion, sweet potatoes and onions may not be tempered.

Tempering the product has an affect on fat and moisture management and ultimately the texture of the final product. In general, tempering the product has an affect on the appearance of the final product and has an affect on fat and moisture management via the adhesion of the surface application, which ultimately improves the texture of the final product. Tempering the product at temperatures and times indicated above provides for a smooth cut of the product. The smooth cut of the product allows for a less jagged appearance, proper surface application adhesion during operation 118, and a reduction in jagged edges. Reducing surface area reduces area through which fat and moisture have an opportunity to migrate, which increases fat and moisture uptake of the product. Proper surface application adhesion during operation 118 provides an impediment around the product to help reduce fat migration during frying and/or vacuum frying operations. The management of fat migration during the vacuum frying and/or frying operations affects the aesthetic properties of the final product. Final products with managed fat and moisture migration, via tempering operation 106, have a crispy and/or crunchy texture. Stated another way, less jagged edges provide for a better product appearance and uniform surface application adhesion mitigates cracks, fissures, and pockets.

3. Sizing & Cutting

From tempering operation 106, operational flow 100 can optionally continue to size operation 108 and/or cut operation 110. The products can be automatically or manually sized. At cut operation 110, the products can be cut into desirable shapes and sizes. In other aspects, the products may not be cut and the whole product utilized in the below processes. The cut can be manual, mechanical, or via a water knife. The product can be cut into a thickness of about 0.05 to 0.50 inches. The product can have a thickness of about 0.05 to 0.10 inches, about 0.10 to 0.15 inches, about 0.15 to 0.20 inches, about 0.20 to 0.25 inches, about 0.25 to 0.30 inches, about 0.30 to 0.35 inches, about 0.35 to 0.40 inches, about 0.40 to 0.45 inches, or about 0.45 to 0.50 inches. In other aspects, the product is not cut and the product is processed whole. In one aspect, cutting the product may not include producing slurry, grinding the product, or mashing the product. In another aspect, cutting the product includes cutting the product into whole product pieces.

In one aspect, the product is cut into strips. As used herein, the term "strips" is used in its broadest sense to include strips having a rectangular cross-section in a shoestring cut. The product could also be cut or shaped into round strips. The strips can have any length naturally inherent to the product from which it is cut. In one aspect, the product can have a length of 5 inches or less. The product can be cut into other specialized cuts (such as so-called "criss" cuts, "crinkle" cuts, "helical" cuts, "waffle" cuts, "chip" cuts, "straight" cuts, or "lattice" cuts and the like). The product can be cut into any combination of cuts discussed herein and/or any combination of known cuts.

In another aspect, products can be cut into rings or strips. Such products can include onion. For example, onions can be cut into pieces suitably sized for onion rings, onion petals, or onion strings/strips. The onion pieces can have a width of 0.1 to 2.0 inches, which can include about 0.10 to 0.20 inches, about 0.20 to 0.30 inches, about 0.30 to 0.40 inches, about 0.40 to 0.50 inches, about 0.50 to 0.60 inches, about 0.60 to 0.70 inches, about 0.70 to 0.80 inches, about 0.80 to 0.90 inches, about 0.90 to 1.00 inches, about 1.00 to 1.10 inches, about 1.10 to 1.20 inches, about 1.20 to 1.30 inches, about 1.30 to 1.40 inches, about 1.40 to 1.50 inches, about 1.50 to 1.60 inches, about 1.60 to 1.70 inches, about 1.70 to 1.80 inches, about 1.80 to 1.90 inches, or about 1.90 to 2.00 inches, inclusive. The onion can have a length of between about ⅜ to 6.0 inches, inclusive.

Although not depicted, from cut operation 110, operational flow 100 can continue to a defect removal operation. At the defect removal operation, the cut product goes through a defect removal process. This process eliminates products that contain defects or cuts the defects off of the product. This process improves the appearance of the finished product by minimizing the amount of defects seen on the final product. The product can also be sorted to remove defective pieces to deliver whole cut, aesthetically pleasing products.

4. Priming

From operation 110, operational flow 100 can optionally continue to prime operation 112. At operation 112, it is decided whether to prime the product. Priming may take place via a priming bath, a heat oven, infrared heating, microwave heating, steam heating, spray heating and/or forced heated air. Depending on the starting raw product, the product may or may not be primed. For example, potatoes, sweet potatoes, fruit, onions, or other vegetables can utilize priming operation 112. As another example, onions, fruit, or other vegetables may not utilize priming operation 112. If it is decided not to prime the product, operational flow 100 continues to operation 114 without priming. In some aspects, priming can be a contributor for managing fat, moisture, and/or product matrix management.

At priming operation 114, the product is primed. Again, as indicated above, priming may be facilitated by a priming bath, an oven, infrared heat, a microwave, steam, forced air, or other source to facilitate the attributes indicated herein. As one non-limiting example, a priming bath may be utilized for priming. The priming bath my include water, flavoring, color additives, and/or a starch. The starch can be optionally added to the priming bath in situations where the starting product does not include a natural starch.

Priming can occur at a temperature of about 90° F. to 195° F., inclusive, for about 0.10 minutes to about 10 minutes, inclusive. The product can be primed for less than 10 minutes. The product can be primed for less than 5 minutes. The product can be primed for less than 3 minutes. The bath can have a temperature of about 90° F. to 95° F., about 95° F. to 100° F., about 100° F. to 105° F., about 105° F. to 110° F., about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., about 150° F. to 155° F., about 155° F. to 160° F., about 160° F. to 165° F., about 165° F. to 170° F., about 170° F. to 175° F., about 175° F. to 180° F., about 185° F. to 190° F., and about 190° F. to 195° F. The product can be primed for about 0.1 to 0.2 minutes, about 0.2 to 0.3 minutes, about 0.3 to 0.4 minutes, about 0.4 to 0.5 minutes, about 0.5 to 0.6 minutes, about 0.6 to 0.7 minutes, about 0.7 to 0.8 minutes, about 0.8 to 0.9 minutes, about 0.9 to 1.0 minutes, about 1.0 to 1.5 minutes, about 1.5 to 2.0 minutes, about 2.0 to 2.5 minutes, about 2.5 to 3.0 minutes, about 3.0 to 3.5 minutes, about 3.5 to 4.0 minutes, about 4.0 to 4.5 minutes, about 4.5 to 5.0 minutes, about 5.0 to 5.5 minutes, about 5.5 to 6.0 minutes, about 6.0 to 7.0 minutes, about 7.0 to 8.0 minutes, about 8.0 to 9.0 minutes, and about 9.0 to 10.0 minutes. The temperature and immersion time can vary (even outside of the noted ranges), depending, among other variables, upon the type of product utilized, the cut configuration of the product, and the size of the product.

As a non-limiting example associated with a potato product, the potato product can be primed at about 155° F. to 165° F. for about 2 to 10 minutes. The potato product can be primed at about 155° F., about 156° F., about 157° F., about 158° F., about 159° F., about 160° F., about 161° F., about 162° F., about 163° F., about 164° F., and about 165° F. The potato product can be primed for about 2.0 to 2.1 minutes, about 2.1 to 2.2 minutes, about 2.2 to 2.3 minutes, about 2.3 to 2.4 minutes, about 2.4 to 2.5 minutes, about 2.5 to 2.6 minutes, about 2.6 to 2.7 minutes, about 2.7 to 2.8 minutes, about 2.8 to 2.9 minutes, about 2.9 to 3.0 minutes, about 3.0 to 3.5 minutes, about 3.5 to 4.0 minutes, about 4.0 to 4.5 minutes, about 4.5 to 5.0 minutes, about 5.0 to 5.5 minutes, about 5.5 to 6.0 minutes, about 6.0 to 7.0 minutes, about 7.0 to 8.0 minutes, about 8.0 to 9.0 minutes, and about 9.0 to 10.0 minutes.

As a non-limiting example associated with a sweet potato, the sweet potato product can be primed at about 185° F. to 200° F. for about 2 to 10 minutes. The sweet potato product can be primed at about 185° F., about 190° F., about 195° F., and about 200° F. The sweet potato product can be primed for about 2.0 to 2.1 minutes, about 2.1 to 2.2 minutes, about 2.2 to 2.3 minutes, about 2.3 to 2.4 minutes, about 2.4 to 2.5 minutes, about 2.5 to 2.6 minutes, about 2.6 to 2.7 minutes, about 2.7 to 2.8 minutes, about 2.8 to 2.9 minutes, and about 2.9 to 3.0 minutes, about 3.0 to 3.5 minutes, about 3.5 to 4.0 minutes, about 4.0 to 4.5 minutes, about 4.5 to 5.0 minutes, about 5.0 to 5.5 minutes, about 5.5 to 6.0 minutes, about 6.0 to 7.0 minutes, about 7.0 to 8.0 minutes, about 8.0 to 9.0 minutes, and about 9.0 to 10.0 minutes.

As a non-limiting example associated with an onion, the onion may or may not be primed. When the onion product is primed, it can be primed at about 90° F. to 110° F. for about 2 to 10 minutes. The onion product can be primed at about 90° F., about 91° F., about 92° F., about 93° F., about 94° F., about 95° F., about 96° F., about 97° F., about 98° F., about 99° F., about 100° F., about 101° F., about 102° F., about 103° F., about 104° F., about 105° F., about 106° F., about 107° F., about 108° F., about 109° F., and about 110° F. The onion product can be primed for about 2.0 to 2.1 minutes, about 2.1 to 2.2 minutes, about 2.2 to 2.3 minutes, about 2.3 to 2.4 minutes, about 2.4 to 2.5 minutes, about 2.5 to 2.6 minutes, about 2.6 to 2.7 minutes, about 2.7 to 2.8 minutes, about 2.8 to 2.9 minutes, and about 2.9 to 3.0 minutes, about 3.0 to 3.5 minutes, about 3.5 to 4.0 minutes, about 4.0 to 4.5 minutes, about 4.5 to 5.0 minutes, about 5.0 to 5.5 minutes, about 5.5 to 6.0 minutes, about 6.0 to 7.0 minutes, about 7.0 to 8.0 minutes, about 8.0 to 9.0 minutes, and about 9.0 to 10.0 minutes.

Priming the product can have an affect on fat and moisture management, product cell matrix, food substrate separation, surface application adhesion, and ultimately the texture and color of the final product. Priming promotes product surface preparation while not degrading the internal cell structures of the product. Stated another way, priming the product forms a primed portion on the product. The primed portion acts as an impediment for fat migration and moisture migration. With some products, during priming, the primed portion of the product is gelatinized and carbohydrates near the surface of the product are concentrated. Simple carbohydrates near the surface are removed and the complex carbohydrates near the surface of the product are concentrated. The gelatinized surface portion and the concentration of the complex carbohydrates are a contributor to proper surface application adhesion. Yet, priming as more fully set forth below, maintains carbohydrate integrity associated with the inner portion of the product. As such, natural flavors associated with the product are maintained during priming. The primed portion is also denser via the concentration of complex carbohydrates. As such, the primed portion provides an area for diffusing steam as steam exits the product during the frying and/or vacuum frying processes. During frying and/or vacuum frying, moisture turns to steam and exits the product from a pressure differential. When the steam encounters the primed portion, the steam is diffused. The diffused steam provides for a managed exit of steam from the product. The managed exit of steam is less likely to blow surface applications off the product during frying and/or vacuum frying. The diffused exit of steam also reduces the formation of steam channels in the product which cause a volatile exit of steam and provides a path for fat to migrate into the product during frying and/or vacuum frying. The management of fat and moisture migration during the frying and/or vacuum frying operation affects the aesthetic properties of the final product.

Priming as set forth herein also facilitates a proper surface for surface application adhesion. In some products, priming facilitates food substrate separation and hydration of the food substrate to allow a proper surface for surface application adhesion and steam generation during frying and/or vacuum frying operations. During frying and/or vacuum frying, moisture in the properly hydrated food substrate turns to steam and exits the product from a pressure differential. When the steam encounters the surface application, the steam is diffused. The diffused steam provides for a managed exit of steam from the product. The managed exit of steam is less likely to blow surface applications off the product during frying and/or vacuum frying. The diffused exit of steam also reduces the formation of steam channels in the product which cause a volatile exit of steam and provides a path for fat to migrate into the product during frying and/or vacuum frying. The management of fat and moisture migration during the frying and/or vacuum frying operation affects the aesthetic properties of the final product. Final products with managed fat, managed moisture, and managed cell matrix, via the priming operation herein, have a crispy and/or crunchy texture.

5. Soak

From priming operation 112 operational flow 100 can optionally continue to soak operation 114. Soak operation 114 may include an atmospheric soak, a pressure soak, a vacuum soak, a cold bath soak, and any combination thereof During soak operation 114, a solution that can include sodium acid pyrophosphate (SAPP), citric acid, sugars, salts, starches, fruit juice concentrates, vegetable juice concentrates, colors, vinegar, acetic acid, flavors, acids, gums, enzymes, and/or mixtures thereof can be applied to the product. In one aspect, a SAPP solution can be applied by spraying, immersing, or dipping the product to prevent graying of the product. The SAPP can be applied as a spray having a concentration of about of 0.05 to 2.0% by weight, about 0.50 to 1.0%, or about 0.70 to 0.80%. The SAPP is applied as a spray having a concentration of about 0.75%. The desired concentration of SAPP and the other ingredients is influenced by the desired color shade and flavor of the end product. For example, as the concentration of dextrose increases, the final color shade in the finished product becomes darker. Following the SAPP spray, the product can be allowed to drain for a few minutes. The product can be allowed to soak for 1 second to 12 hours. A high velocity fan nozzle can be used to blow off excess surface moisture which otherwise can break down the frying oil through hydrolysis.

As a non-limiting example associated with a potato product or a sweet potato product, the potato product or sweet potato product can be soaked for about 0 to 2 minutes. As a non-limiting example associated with an onion product, the onion product may not be soaked.

6. Moisture Reduction

From soak operation 114, operational flow 100 can optionally continue to operation 116. At operation 116, it can be decided whether to perform moisture reduction on the product. Depending on the starting raw product, the product may or may not proceed to moisture reduction operation 116. For example, potatoes, sweet potatoes, fruit, or other vegetables can utilize moisture reduction operation 116. As another example, onions, fruit, or other vegetables may not utilize moisture reduction operation 116. If it is decided not to perform moisture reduction, operational flow 100 continues to operation 118.

At moisture reduction operation 116, the product can utilize moisture reduction via forced air, oven heat, infrared, microwave, mechanical moisture reduction, chemical moisture reduction, drip drying, atmospheric drying, or other methods. The product can receive moisture reduction at a temperature of about 65° F. to 250° F., inclusive, for about 1 to 20 minutes, inclusive. Depending on the starting product, the temperature can be much broader. For example from about 50° F. to about 450° F. The product can receive moisture reduction at a temperature of about 65° F., to 70° F., about 70° F. to 75° F., about 75° F. to 80° F., about 80° F. to 85° F., about 85° F. to 90° F., about 90° F. to 95° F., about 95° F. to 100° F., about 100° F. to 105° F., about105° F. to 110° F., about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., about 150° F. to 155° F., about 155° F. to 160° F., about 160° F. to 165° F., about 165° F. to 170° F., about 170° F. to 175° F., about 175° F. to 180° F., about 180° F. to 185° F., about 185° F. to 190° F., about 190° F. to 195° F., about 195° F. to 200° F., about 200° F. to 205° F., about 205° F. to 210° F., about 210° F. to 215° F., about 215° F. to 220° F., about 220° F. to 225° F., about 225° F. to 230° F., about 230° F. to 235° F., about 235° F. to 240° F., about 240° F. to 245° F., and about 245° F. to 250° F. The product can receive moisture reduction for about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, or about 20 minutes.

As a non-limiting example associated with a potato product, the potato product can receive moisture reduction at about 110° F. to 200° F. for about 5 to 15 minutes. The potato product can receive moisture reduction at about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., about 150° F. to 155° F., about 155° F. to 160° F., about 160° F. to 165° F., about 165° F. to 170° F., about 170° F. to 175° F., about 175° F. to 180° F., about 180° F. to 185° F., about 185° F. to 190° F., about 190° F. to 195° F. and about 195° F. to 200° F. The potato product can receive moisture reduction for about 5 minutes, about 6 minutes, about 7 minutes, about 8 minutes, about 9 minutes, about 10 minutes, about 11 minutes, about 12 minutes, about 13 minutes, about 14 minutes, and about 15 minutes.

As a non-limiting example associated with a sweet potato product, the sweet potato product can receive moisture reduction at about 110° F. to 200° F. for about 5 to 15 minutes. The sweet potato product can receive moisture reduction at about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., about 150° F. to 155° F., about 155° F. to 160° F., about 160° F. to 165° F., about 165° F. to 170° F., about 170° F. to 175° F., about 175° F. to 180° F., about 180° F. to 185° F., about 185° F. to 190° F., about 190° F. to 195° F. and about 195° F. to 200° F. The sweet potato product can receive moisture reduction for about 5 minutes, about 6 minutes, about 7 minutes, about 8 minutes, about 9 minutes, about 10 minutes, about 11 minutes, about 12 minutes, about 13 minutes, about 14 minutes, and about 15 minutes.

As a non-limiting example associated with an onion, the onion product can receive moisture reduction at about 65° F. to 110° F. for about 1 to 5 minutes. In one aspect, moisture reduction includes drip drying. The onion product can receive moisture reduction at about 65° F. to 70° F., about 70° F. to 75° F., about 75° F. to 80° F., about 80° F. to 85° F., about 85° F. to 90° F., about 90° F. to 95° F., about 95° F. to 100° F., about 100° F. to 105° F. and about 105° F. to 110° F. The onion product can receive moisture reduction for about 1 minute, about 2 minutes, about 3 minutes, about 4 minutes, and about 5 minutes.

Moisture reduction of the product has an affect on fat and moisture management and ultimately the texture of the final product. Moisture reduction operation 116 removes surface moisture from the product. The water removal prepares the product for surface applications. The removal of the water improves surface application adhesion. The reduction of water prevents the surface application from sliding, prevents unwanted dilution of the surface application to maintain a solid percentage, and prevents trapping of water under the surface application that can cause the surface application to blow off during frying and/or vacuum frying operations. In one aspect, moisture reduction operation 116 gelatinizes the surface of a product to create a tacky layer on the product and to further concentrate complex carbohydrates from priming. This tacky layer increases the adhesion of the surface application to allow for coverage of the surface of the product. Proper surface application adhesion during operation 118 provides an impediment around the product to help manage fat migration, add color, add flavor, and provide a unique appearance during frying and/or vacuum frying operations. The management of fat and moisture migration during the frying and/or vacuum frying affects the aesthetic properties of the final product. Final products with managed fat migration and managed moisture content, via moisture reduction operation 116, have a crispy and/or crunchy texture, enhanced color, enhanced flavor, and enhanced appearance.

7. Surface Applications

From moisture reduction operation 116, operational flow 100 optionally continues to operation 118. At operation 118, it is decided whether to apply a surface application to the product. Depending on the starting raw product, the product may or may not receive a surface application. For example, onions, potatoes, sweet potatoes, fruit, or other vegetables can utilize operation 118. As another example, potatoes and sweet potatoes, fruit, and/or other vegetables may not utilize operation 118. The batter can be a consumer perceivable surface application such as a batter and the batter can be a consumer unperceivable surface application such as a coating. During surface application operation 118, the product can go through a combination of battering and predusting/breading. Predusting/breading can include different coarsenesses of flour, a combination of dry ingredients that could include flour, baked cracked meal, starch, flavors, colors, spices, or other dry ingredients. The product could be battered, predusted then battered, battered-predusted-battered, battered-predusted-battered-predusted/breaded, etc. When multiple batters are used, they can be the same batter or different batter. If it is decided not to apply a surface application to the product, operational flow 100 continues to operation 120 without a surface application.

Various kinds of starch (functional starches and/or flours) can be utilized in the batter, such as corn starch, potato starch, tapioca starch, arrowroot starch, rice starch, oat starch, barley starch, wheat starch, and combinations thereof The batter composition can include starches, fiber, gums, flours, proteins, flavors, spices, colors, seasonings, and ingredients thereof.

The effectiveness of the surface application can be dependent, in part, upon the composition of the surface application, the viscosity of the surface application, the amount of surface application utilized, the adhesion of the surface application, and the evenness of the surface application. As stated, tempering operation 106, priming operation 112, and moisture reduction application 116 have a positive affect on surface application adhesion. The fat impediment properties and the adhesion of the surface application have an affect on fat management, product matrix, moisture migration, color, flavor, and texture associated with the product. If not enough surface application is utilized, more fat will be absorbed during frying and/or vacuum frying having a negative affect on the texture and appearance of the fried product. The coating of the surface application can be impeded by the shape of the surface of the product. Jagged edges and crevices decrease the evenness of the surface application and can prevent the surface application from coating the surface. Further, ruptured cells can absorb portions of the surface application and can decrease its evenness and create a need for more surface application. The amount of surface application utilized can also have an affect on the end texture. The percentage of solids in the surface application has an affect on the viscosity and the products pick up/absorption rate. A surface application viscosity of 7 to 20 seconds on a Stein cup can be used. The viscosity can be about 7 seconds, about 8 seconds, about 9 seconds, about 10 seconds, about 11 seconds, about 12 seconds, about 13 seconds, about 14 seconds, about 15 seconds, about 16 seconds, about 17 seconds, about 18 seconds, about 19 seconds, or about 20 seconds. If not enough surface application or surface application with too low of a viscosity is utilized, the finished product will have too little color, and/or flavor. The surface application can also have an appearance of particulates and more fat can be absorbed during the frying and/or vacuum frying operation having a negative affect on texture and aesthetics to the fried product. Aspects of the batter composition provide the desired texture of the fried food product.

As a non-limiting example associated with a sweet potato or a potato product, the sweet potato or potato product can receive a surface application having a viscosity of about 8 to 10 seconds (Stein cup measurement). The viscosity may be about 8.0 to 8.5 seconds, about 8.5 to 9.0 seconds, about 9.0 to 9.5 seconds, and about 9.5 to 10.0 seconds. The viscosity can be less than 10 seconds.

As a non-limiting example associated with an onion product, the onion product can be battered a first time, dusted, and battered a second time. The first and second batter can have a viscosity of about 9 to 12 seconds (Stein cup measurement). The viscosity can be about 9.0 to 9.5 seconds, about 9.5 to 10.0 seconds, about 10.0 to 10.5 seconds, about 10.5 to 11.0 seconds, about 11.0 to 11.5 seconds, and about 11.5 to 12.0 seconds.

8. Fry

From surface application operation 118, operational flow 100 can optionally continue to fry operation 120. At fry operation 120, the product can be fried in hot oil. In another aspect, fry operation 120 may include setting surface applications via radiant heat, superheated beads, heated air, microwave, infrared, sprayed oil, etc. In another aspect, the product can be fried via a vacuum fry operation as indicated in operation 124. The product can be fried at a temperature of about 250 to 400° F., inclusive, for about 0.1 minutes to 7.5 minutes, inclusive. The product can be fried at a temperature of about 250° F. to 255° F., about 255° F. to 260° F., about 260° F. to 265° F., about 265° F. to 270° F., about 270° F. to 275° F., about 275° F. to 280° F., about 280° F. to 285° F., about 285° F. to 290° F., about 290° F. to 295° F., about 295° F. to 300° F., about 300° F. to 305° F., about 305° F. to 310° F., about 310° F. to 315° F., about 315° F. to 320° F., about 320° F. to 325° F., about 325° F. to 330° F., about 330° F. to 335° F., about 335° F. to 340° F., about 340° F. to 345° F., about 345° F. to 350° F., about 350° F. to 355° F., about 355° F. to 360° F., about 360° F. to 365° F., about 365° F. to 370° F., about 370° F. to 375° F., about 375° F. to 380° F., about 380° F. to 385° F., about 385° F. to 390° F., about 390° F. to 395° F. and about 395° F. to 400° F. The product can be fried for about 0.10 to 0.20 minutes, about 0.20 to 0.30 minutes, about 0.30 to 0.40 minutes, about 0.40 to 0.50 minutes, about 0.50 to 0.60 minutes, about 0.60 to 0.70 minutes, about 0.70 to 0.80 minutes, about 0.80 to 0.90 minutes, about 0.90 to 1.0 minutes, about 1.0 to 1.10 minutes, about 1.10 to 1.20 minutes, about 1.20 to 1.30 minutes, about 1.30 to 1.40 minutes, about 1.40 to 1.50 minutes, about 1.50 to 1.60 minutes, about 1.60 to 1.70 minutes, about 1.70 to 1.80 minutes, about 1.80 to 1.90 minutes, about 1.90 to 2.00 minutes, about 2.00 to 2.10 minutes, about 2.10 to 2.20 minutes, about 2.20 to 2.30 minutes, about 2.30 to 2.40 minutes, about 2.40 to 2.50 minutes, about 2.50 to 2.60 minutes, about 2.60 to 2.70 minutes, about 2.70 to 2.80 minutes, about 2.80 to 2.90 minutes, about 2.90 to 3.00 minutes, about 3.00 to 3.10 minutes, about 3.10 to 3.20 minutes, about 3.20 to 3.30 minutes, about 3.30 to 3.40 minutes, about 3.40 to 3.50 minutes, about 3.50 to 3.60 minutes, about 3.60 to 3.70 minutes, about 3.70 to 3.80 minutes, about 3.80 to 3.90 minutes, about 3.90 to 4.00 minutes, about 4.00 to 4.10 minutes, about 4.10 to 4.20 minutes, about 4.20 to 4.30 minutes, about 4.30 to 4.40 minutes, about 4.40 to 4.50 minutes, about 4.50 to 4.60 minutes, about 4.60 to 4.70 minutes, about 4.70 to 4.80 minutes, about 4.80 to 4.90 minutes, about 4.90 to 5.00 minutes, about 5.00 to 5.10 minutes, about 5.10 to 5.20 minutes, about 5.20 to 5.30 minutes, about 5.30 to 5.40 minutes, about 5.40 to 5.50 minutes, about 5.50 to 5.60 minutes, about 5.60 to 5.70 minutes, about 5.70 to 5.80 minutes, about 5.80 to 5.90 minutes, about 5.90 to 6.00 minutes, about 6.00 to 6.10 minutes, about 6.10 to 6.20 minutes, about 6.20 to 6.30 minutes, about 6.30 to 6.40 minutes, about 6.40 to 6.50 minutes, about 6.50 to 6.60 minutes, about 6.60 to 6.70 minutes, about 6.70 to 6.80 minutes, about 6.80 to 6.90 minutes, about 6.90 to 7.00 minutes, about 7.00 to 7.10 minutes, about 7.10 to 7.20 minutes, about 7.20 to 7.30 minutes, about 7.30 to 7.40 minutes, or about 7.40 to 7.50 minutes. The product can also be fried in a two-step process. The temperatures for either frying step can utilize any of the frying temperatures listed above. The amount of time for frying for each step can utilize any of the frying times listed above. The product is fried in any hot oil suitable for frying, such as high oleic oil, low linolenic oil, saturated, unsaturated, polyunsaturated, and/or monounsaturated fats/oils. Fry operation 120 provides for desirable color and sets the batter to provide an impediment to minimize fat migration, provide color, flavor, appearance, and texture (crispy shell). By setting the surface application during fry operation, an impediment is formed to facilitate the diffusion of moisture in the product as the moisture turns to steam. The frying stage can also deactivate enzymes. If two stages of frying are utilized, the first stage can set the surface application, while the second stage can develop color and increase the product's solid percentage. Frying operation 120 can help reduce vacuum frying time. In general, setting the surface application during frying forms an initial impediment around the product to help manage fat and moisture migration during frying and/or vacuum frying. During frying, moisture is forced out of the product through the primed portion and/or surface application via steam. The steam has an outward force which hinders the movement of oil into the product as the steam exits. The exiting of the steam is managed via the management of the cell structure matrix of the product and via the primed portion. The surface application can also facilitate the management of the exiting steam. For example, the internal cell matrix is managed to mitigate the formation of pockets, fissures, and channels in the product which will cause an explosive exit of steam as opposed to a diffused managed exit of steam. The management of the steam provides a generally consistent outward force from the steam which reduces inconsistent fat migrations into the product. The management of fat migration during the frying operation affects the aesthetic properties of the final product. Final products with managed fat migration, via the fry operation set forth herein, have a crispy and/or crunchy texture which is more aesthetically pleasing to end consumers. Although fry operation 120 is described as being an atmospheric pressure frying operation, fry operation 128 can also include frying under vacuum, or frying under pressure.

As a non-limiting example associated with a potato, the potato can be fried at about 350° F. to 380° F. The potato can be fried at about 350° F. to 355° F., about 355° F. to 360° F., about 360° F. to 365° F., about 365° F. to 370° F., about 370° F. to 375° F. and about 375° F. to 380° F. The frying can include a first fry step and a second fry step. The first fry step can be about 12-20 seconds. The first fry step can be about 12 seconds, about 13 seconds, about 14 seconds, about 15 seconds, about 16 seconds, about 17 seconds, about 18 seconds, about 19 seconds, and about 20 seconds. The second fry step can be about 20-45 seconds. The second fry step can be about 20-25 seconds, about 25-30 seconds, about 30-35 seconds, about 35-40 seconds, and about 40-45 seconds.

As a non-limiting example associated with a sweet potato, the sweet potato can be fried at about 350° F. to 380° F. The sweet potato can be fried at about 350° F. to 355° F., about 355° F. to 360° F., about 360° F. to 365° F., about 365° F. to 370° F., about 370° F. to 375° F. and about 375° F. to 380° F. The frying can include a first fry step and a second fry step. The first fry step can be about 12-20 seconds. The first fry step can be about 12 seconds, about 13 seconds, about 14 seconds, about 15 seconds, about 16 seconds, about 17 seconds, about 18 seconds, about 19 seconds, and about 20 seconds. The second fry step can be about 20 to 45 seconds. The second fry step can be about 20 to 25 seconds, about 25 to 30 seconds, about 30 to 35 seconds, about 35 to 40 seconds, and about 40 to 45 seconds.

As a non-limiting example associated with an onion, the onion can be fried at about 350° F. to 380° F. The onion can be fried at about 350° F. to 355° F., about 355° F. to 360° F., about 360° F. to 365° F., about 365° F. to 370° F., about 370° F. to 375° F. and about 375° F. to 380° F. The fry step can be about 20 to 45 seconds. The fry step can be about 20 seconds, about 25 seconds, about 30 seconds, about 35 seconds, about 40 seconds, and about 45 seconds.

10. Freeze

From fry operation 120, operational flow 100 can optionally continue to freeze operation 122. Depending on the starting raw product, the product may or may not be frozen. For example, onions, sweet potatoes, potatoes, fruit, and other vegetables can utilize the freeze operation. As another example, onions, sweet potatoes, potatoes, fruit, and other vegetables may not utilize the freeze operation. The product can utilize freeze operation 122 when shipping to another location when vacuum frying is desired or when further maintenance of the internal structural product matrix is desired. If it is decided not to freeze the product, operational flow 100 continues to operation 124 as indicated below. In one aspect, the product can be initially cooled to a temperature of 40° F. to 180° F. to remove the latent heat. The product can be cooled for about 5 minutes. The product can be cooled to a temperature of about 40° F. to 45° F., about 45° F. to 50° F., about 50° F. to 55° F., about 55° F. to 60° F., about 60° F. to 65° F., about 65° F. to 70° F., about 70° F. to 75° F., about 75° F. to 80° F., about 80° F. to 85° F., about 85° F. to 90° F., about 90° F. to 95° F., about 95° F. to 100° F., about 100° F. to 105° F., about 105° F. to 110° F., about 110° F. to 115° F., about 115° F. to 120° F., about 120° F. to 125° F., about 125° F. to 130° F., about 130° F. to 135° F., about 135° F. to 140° F., about 140° F. to 145° F., about 145° F. to 150° F., about 150° F. to 155° F., about 155° F. to 160° F., about 160° F. to 165° F., about 165° F. to 170° F., about 170° F. to 175° F. and about 175° F. to 180° F. Cooling can speed up the freeze operation 122 and further reduce the moisture content of the product.

The product can be quickly frozen until the product reaches a temperature of no more than 32° F. In another aspect, the product is frozen until it reaches a temperature less than 18° F. The product can be quick frozen at a temperature of about −40° F. to 0° F. The product can be quick frozen at a temperature of about −40° F., about −35° F., about −30° F., about −25° F., about −20° F., about −15° F., about −10° F., about −5° F. and about 0° F. In one aspect, the product can be quick frozen at −16° F. −17° F. or −18° F. The product can be quick frozen for about 5 to 30 minutes. In one aspect the product is frozen for about 10 minutes, about 11 minutes, or about 12 minutes.

In general, the freeze manages the structures of the cells in the product by reducing cell ruptures and structural collapse during frying and/or vacuum frying. For example, the formation of ice crystals provides structural support for the internal product matrix as the product is fried and/or vacuum fried. When a product is fried and/or vacuum fried, the product thaws from the outside of the product to the inside of the product. The thawing changes the ice into liquid. Then the liquid is turned to steam. The transformation from ice to steam takes more energy and time than a transformation from liquid to steam. As such, internal cells of the internal product matrix are structurally supported for a longer time via the ice crystals of the internal cells. This allows time for the heat to fix the structural product matrix before it collapses from the existence of steam.

Further, managed cell structures facilitate the management of fat migration in the product. The freeze also solidifies fat on the outside of the product. As the frozen fat thaws on the surface of the product during frying and/or vacuum frying, fat is impeded from entering the product. Moreover, freezing the product manages moisture in the product. The freeze causes a distribution of small ice crystals in the product. When the product is fried and/or vacuum fried, the small ice crystals vaporize into steam. The steam is defused from the product via the priming portion and/or surface application to cause an outward force from the steam. This outward force impedes the migration of oil into the product across the surface of the product. From the distribution and size of the ice crystals, steam is diffused throughout the product as opposed to the steam being localized through moisture pockets or large ice crystal formation and channels in the product cell matrix. Accordingly, freezing the product provides a window of time when fat migration into the product is hindered. Freezing also sets the surface application which creates an impediment for preventing the absorption of oil and fat during frying and/or vacuum frying. Freezing the product further allows for the product to remain free flowing, which minimizes the formation of clumps in the frying and/or vacuum frying process that creates an undesirable appearance and texture in the finished product. Therefore, freezing manages fat, moisture migration, and product matrix, and improves the resulting texture of the product.

As one non-limiting example associated with an onion, fruit, potato, vegetable, or sweet potato, the onion, fruit, potato, vegetable, or sweet potato can be frozen at a temperature of about 0° F. to −40° F. for about 10 to 12 minutes. The products can be frozen at a temperature of about −16° F., about −17° F. and about −18° F. The products can be frozen for about 10 minutes, about 11 minutes, and about 12 minutes.

11. Vacuum Fry

From freeze operation 122, operational flow 100 can optionally continue to vacuum fry operation 124. As indicated, the product may be fried only, vacuum fried only, or fried and vacuum fried. Vacuum fry operation 124 vacuum fries the product in oil to a moisture content of at most about 10%. The moisture may be less than 5% moisture. The moisture content after vacuum frying can be at most about 10%, about 9.5%, about 9.0%, about 8.5%, about 8.0%, about 7.5%, about 7.0%, about 6.5%, about 6.0%, about 5.5%, about 5.0%, about 5.90%, about 5.80%, about 5.70%, about 5.60%, about 5.50%, about 5.40%, about 5.30%, about 5.20%, about 5.10%, about 5.00%, about 4.90%, about 4.80%, about 4.70%, about 4.60%, about 4.50%, about 4.40%, about 4.30%, about 4.20%, about 4.10%, about 4.00%, about 3.90%, about 3.80%, about 3.70%, about 3.60%, about 3.50%, about 3.40%, about 3.30%, about 3.20%, about 3.10%, about 3.00%, about 2.90%, about 2.80%, about 2.70%, about 2.60%, about 2.50%, about 2.40%, about 2.30%, about 2.20%, about 2.10%, about 2.00%, about 1.90%, about 1.80%, about 1.70%, about 1.60%, about 1.50%, about 1.40%, about 1.30%, about 1.20%, about 1.10%, about 1.00%, about 0.90%, about 0.80%, about 0.70%, about 0.60%, about 0.50%, about 0.40%, about 0.30%, about 0.20%, or about 0.10%. The amount of moisture in the vacuum fried food product affects the texture of the vacuum fried food product. Higher moisture will result in a chewy and less crispy product.

The product may be fried in oil having a temperature between about 190° F. to 265° F. inclusive, for about 5 to 45 minutes, inclusive. The product can be fried at about 190° F. to 195° F., about 195° F. to 200° F., about 200° F. to 205° F., about 205° F. to 210° F., about 210° F. to 215° F., about 215° F. to 220° F., about 220° F. to 225° F., about 225° F. to 230° F., about 230° F. to 235° F., about 235° F. to 240° F., about 240° F. to 245° F., about 245° F. to 250° F., about 250° F. to 255° F., about 255° F. to 260° F. and about 260° F. to 265° F. If the product is frozen by freezing operation 122, the oil can have a different starting temperature than its frying temperature to adjust for the impact of the frozen product on the oil temperature. The vacuum pressure is maintained at about 26 to 29.92 inches of mercury. The vacuum pressure can be about 26 inches, about 27 inches, about 28 inches, or about 29 inches of mercury. The vacuum pressure can be about 26 to 27 inches, about 26 to 28 inches, about 26 to 29 inches, about 27 to 28 inches, about 27 to 29 inches, and about 28 to 29 inches of mercury. At a constant temperature, the higher the vacuum in inches of mercury, the more readily water vaporizes, forcing steam out of the product and allowing less fat to migrate into the product, typically leading to a reduced fry time. The lower the vacuum in inches of mercury, the less steam is being produced, leading to more fat migration into the product typically leading to increased frying time. The vacuum fryer provides a closed, sealed environment from which air and other vapors are being evacuated continuously. The vacuum fryer can agitate/shake the products during vacuum frying. The agitation can prevent clumping during the vacuum frying and promote a more even cooking of the product.

As one non-limiting example associated with potatoes, sweet potatoes, vegetables, and onions, the product can be vacuum fried at a temperature of about 250° F. to 265° F. for about 15 to 20 minutes at a pressure of about 26 to 29.92 inches. The temperature can be about 250° F., about 255° F., about 260° F. and about 265° F. The vacuum fry time can be about 15 minutes, about 16 minutes, about 17 minutes, about 18 minutes, about 19 minutes, and about 20 minutes.

The parameters utilized to vacuum fry the product are calculated so that vacuum frying mitigates fat migration, mitigates excess moisture, mitigates cell degradation, mitigates oil degradation, and mitigates the degradation of desired nutrients. The other operations set forth herein have an affect on the outcome of the vacuum frying operation. Tempering the product results in enhanced surface application adhesion. The enhanced surface application adhesion reduces batter blow off during vacuum frying. The reduced batter blow off reduces the paths through which fat can migrate into the product. Priming the product creates a priming portion and/or facilitates proper surface application adhesion and hydration. The priming portion can include a tacky surface which promotes batter adhesion. The enhanced surface application adhesion reduces batter blow off during vacuum frying. The reduced batter blow off reduces the paths through which fat can migrate into the product. The primed portion can also include concentrated complex carbohydrates. The primed portion and/or surface application diffuses steam as it exits the product during vacuum frying. The diffused steam reduces the force of the steam and mitigates surface application blow off. The diffused steam also provides an outward force from the product sufficient to counter the force of fat migration into the product. Moisture reduction results in enhanced surface application adhesion which reduces fat uptake during vacuum frying. The enhanced surface application adhesion reduces batter blow off during vacuum frying. The reduced batter blow off reduces the paths through which fat can migrate into the product. Frying results in a set surface application which reduces fat uptake during vacuum frying. Freezing provides for small ice crystals and a managed internal cell structure, which provides a window for reduced fat migration into the product during vacuum frying via the steam exiting the product.

12. Oil Reduction

From vacuum fry operation 124, operational flow 100 can optionally continue to operation 126. At operation 126, it is decided whether to reduce the oil in the product. In one aspect, oil is reduced via a centrifugal process. In another aspect, oil is reduced in a non-intrusive oil reduction process. Non-intrusive oil reduction can include a hold process where the oil is allowed to drip from the product under vacuum. During a product hold process, the product is held under a vacuum from about 1 to 10 minutes to allow for excess oil to drip off. The hold process can be held under a vacuum for about 1 minute, about 2 minutes, about 3 minutes, about 4 minutes, about 5 minutes, about 6 minutes, about 7 minutes, about 8 minutes, about 9 minutes, or about 10 minutes. Operation 126 can hold the vacuum fried food product under the same vacuum pressure as utilized in the vacuum frying to allow for the excess oil to drip off. Holding the product in a vacuum is a non-intrusive process for removing excess oil from the product. In another aspect, the oil can include a seasoning or a seasoning can be applied to the product under pressure. When the vacuum is released, the pressure differential between the inside of the product and the atmospheric pressure causes a minor suction. This minor suction can be utilized to infuse flavors into the product.

13. Seasoning

From oil reduction operation 126, operational flow 100 can optionally continue to seasoning operation 128. At operation 128, the product may or may not be seasoned. If it is decided not to season the product, operational flow 100 continues to operation 130 as indicated below. If it is decided to season the product, the seasoning can be applied by any suitable method for applying a seasoning to the product. For example, the seasoning can be applied via a topical application, a waterfall application, a spray application, a tumbling application, a dipping application, or combinations thereof The seasoning can be any edible seasoning, flavoring, coloring, and seasoning combination as desired. For example, the seasoning can include cheddar, ranch, barbecue, rosemary, garlic, pepper, red pepper, parsley, Italian spices, or combinations thereof This list is not restrictive.

In another aspect, seasoning can be applied during any operation of operational flow 100. Seasoning of the product is not restricted to seasoning at operation 128. For example, the tempering bath may include a seasoning that is infused into the product under atmospheric pressure or in a vacuum at tempering operation 106. As another example, seasoning may be applied to the priming bath at operation 112. In yet another example, seasoning may be applied during soak operation 114. In still another example, seasoning may be incorporated into the surface application at operation 118. In still other examples, oil may include flavoring for infusing flavor during fry operation 120 and/or vacuum fry operation 124.

14. Packaging & Equilibration

Operational flow 100 continues to package operation 130 where the product is packaged. The product can be packaged to have a modified atmosphere with reduced oxygen levels to increase the time before expiration. The package can contain about 5% oxygen. The package can contain about 0%, about 1%, about 2%, about 3%, about 4%, or about 5% oxygen. During packaging, a gas flush and/or oxygen scavenges can be utilized to reduce the oxygen level. In one aspect, the gas flush can include aromatics to provide a desirable scent to the packaged product.

From package operation 130, operational flow 100 can continue to equilibration operation 132. At operation 132, the product may or may not be allowed to equilibrate. If it is decided not to equilibrate the product, operational flow 100 continues to end operation 134, as indicated below. If it is decided to equilibrate the product, the product is equilibrated by letting the packaged product set before shipping. Operational flow then ends at end operation 134.

B. Exemplary Process Combinations

As more fully set forth below in this section, a few exemplary process combinations are discussed. The combination examples are not meant to limit the scope of the application in any manner but are merely to provide examples of a process in association with a product. A myriad of process combinations exist for each product to achieved a resulting product depending on the attributes desired in the resulting product.

In one aspect, the process may include a process for making a shelf stable food product. The process may include priming the whole food piece for about 0.10 minutes to about 10 minutes to create a primed food piece, applying a surface application to the primed food piece to create a food piece having a surface application, frying the food piece having the surface application to create a fried food product, and packaging the fried food product in a package having reduced atmospheric oxygen levels to create the shelf stable food product. The process may include frying or vacuum frying and the reduced atmospheric oxygen levels may include about 0% to about 5% oxygen.

The whole food piece of the process may include at least one member of a group comprising: a strip cut, a shoestring cut, a criss cut, a crinkle cut, a helical cut, a waffle cut, a straight cut, a ring shape, a petal cut, and a lattice cut. The whole food piece of the process may include at least one member of a group comprising: a fruit and a vegetable.

The process may further include applying a soak solution to the primed food piece, wherein the soak solution includes at least one member of a group comprising: sodium acid pyrophosphate (SAPP), citric acid, sugar, salt, starch, fruit juice concentrate, vegetable juice concentrate, color, vinegar, acetic acid, flavor, acid, gum, and enzymes.

The priming of the food piece may include priming at a temperature of at least one member of a group comprising: 155° F. to about 165° F. and 185° F. to about 200° F. The priming of the food piece may include priming the whole food piece in a priming bath to create a primed portion of concentrated complex carbohydrates while maintaining an unprimed portion of the whole food piece.

Applying a surface application to the primed food piece may include at least one member of a group comprising:

coating, battering, predusting then battering, battering then predusting then battering a second time, battering then predusting then battering a second time then breading, battering then predusting then battering a second time then predusting a second time then battering a third time, battering then predusting then battering a second time then predusting a second time then battering a third time then breading.

The process may also include causing non-intrusive oil reduction after the frying. The non-intrusive oil reduction may include holding the fried food product to cause excess oil to drip from the fried food product. The non-intrusive oil reduction may further include applying a flavoring to the fried food product to cause flavorings to infuse into the fried food product.

The process may further include freezing prior to frying to create a frozen food product. Freezing may include initially cooling the product to a temperature of about 40° F. to about 180° F. prior to freezing.

The process for making a shelf stable food product may include the resulting shelf stable food product having a fried food portion, a surface application portion proximal a surface of the fried food portion, a fat content of an outer portion of the shelf stable food product of about 55% to about 95% of total fat content of the shelf stable food product, about 0% wt moisture to about 10% wt moisture, and a water activity of about 0 to about 0.6. The fried food portion of the resulting food product may include a primed portion and an unprimed portion. The primed portion may include a concentration of complex carbohydrates in relation to the unprimed portion.

In another aspect, the process may include a process for making a shelf stable food product. The process may include applying a surface application to a food piece to create a food piece having a surface application, frying the food piece having a surface application in oil to create a fried food product having a fat content of the surface application portion of about 55% to about 95% of the total fat of the shelf stable food product, and packaging the fried food product in a package having reduced atmospheric oxygen levels.

The process for making a shelf stable food product may include the resulting shelf stable food product having a fried food portion, a surface application portion, a void portion between the surface application portion and the fried food portion, a fat content of an outer portion of the shelf stable food product of about 55% to about 95% of total fat content of the shelf stable food product, about 0% wt moisture to about 10% wt moisture, and a water activity of about 0 to about 0.6.

In another aspect, the process may include a process for making a shelf stable potato product. The process for making the shelf stable potato product may include cutting a potato to create a whole potato piece having a thickness of about 0.25 inches to about 0.50 inches, priming the whole potato piece for about 0.10 minutes to about 10 minutes to create a primed potato piece, applying a surface application to the primed potato piece to create a potato piece having a surface application, frying the potato piece having the surface application to create a fried potato product, and packaging the fried potato product in a package having reduced atmospheric oxygen levels to create the shelf stable potato product. The reduced oxygen levels may include about 0% to about 5% oxygen. The frying may include atmospheric frying and/or vacuum frying.

Cutting the potato may include cutting the potato to have at least one member of a group comprising: a strip cut, a shoestring cut, a criss cut, a crinkle cut, a helical cut, a waffle cut, a straight cut, and a lattice cut. The whole potato piece may be at least one member of a group comprising: a Russet potato, a Goldrush potato, a White potato, a Red potato, a Yellow potato, a Ruby potato, an Australian potato, a Yukon potato, a Peruvian Blue potato, a Superior potato, a Kennebec potato, a Katchdin potato, a New potato, and a Sweet potato.

The process for making a shelf stable potato product may also include applying a soak solution to the primed potato piece, wherein the soak solution includes at least one member of a group comprising: sodium acid pyrophosphate (SAPP), citric acid, sugar, salt, starch, fruit juice concentrate, vegetable juice concentrate, color, vinegar, acetic acid, flavor, acid, gum, and enzymes.

The whole potato piece may be primed at a temperature of at least one member of a group comprising: 155° F. to about 165° F. and 185° F. to about 200° F. Priming the whole potato piece may include priming the whole potato piece in a priming bath to create a primed portion of concentrated complex carbohydrates while maintaining an unprimed portion of the whole potato piece.

Applying a surface application to the dried potato piece may include at least one member of a group comprising: battering, predusting then battering, battering then predusting then battering a second time, battering then predusting then battering a second time then breading, battering then predusting then battering a second time then predusting a second time then battering a third time, battering then predusting then battering a second time then predusting a second time then battering a third time then breading.

The process for making a shelf stable potato product may also include causing non-intrusive oil reduction after the frying. The non-intrusive oil reduction includes holding the fried potato product to cause excess oil to drip from the fried potato product. The non-intrusive oil reduction may further include applying a flavoring to the fried potato product to cause flavorings to infuse into the fried potato product.

The process for making a shelf stable potato product may also include freezing prior to frying to create a frozen potato product. The freezing may include initially cooling to a temperature of about 40° F. to about 180° F. prior to freezing.

The process for making a shelf stable potato product may include the resulting shelf stable potato product having a fried potato portion having a thickness of about 0.25 inches to about 0.50 inches, a surface application portion proximal a surface of the fried potato portion, a fat content of an outer portion of the shelf stable potato product of about 55% to about 95% of total fat content of the shelf stable potato product, about 0% wt moisture to about 10% wt moisture, a water activity of about 0 to about 0.6, and a hardness of about 1000 g to about 4600 g. The fried potato portion may include a primed portion and an unprimed portion. The primed portion may include a concentration of complex carbohydrates in relation to the unprimed portion.

In another aspect, the process may include a process for making a shelf stable onion product. The process for making the shelf stable onion product may include applying a batter to an onion piece to create an onion piece having a batter, frying the onion piece having the batter in oil to create a fried onion product having a fat content of the batter of about 55% to about 95% of the total fat of the shelf stable onion product, and packaging the fried onion product in a package having reduced atmospheric oxygen levels. The reduced atmospheric oxygen level may include an oxygen level of about 0% to about 5%. The frying may include frying at atmospheric pressure and/or frying under a vacuum.

The process for making a shelf stable onion product may include freezing the onion piece having the batter prior to frying. Freezing may include freezing at sub-zero temperatures. Freezing may also include initially cooling to a temperature of about 40° F. to about 180° F. prior to freezing.

The process for making a shelf stable onion product may further include hydrating the onion piece in a soak solution that includes at least one member of a group comprising: sodium acid pyrophosphate (SAPP), citric acid, sugar, salt, starch, fruit juice concentrate, vegetable juice concentrate, color, vinegar, acetic acid, flavor, acid, gum, and enzymes.

The battering may include at least one member of a group comprising: coating, battering, predusting then battering, battering then predusting then battering a second time, battering then predusting then battering a second time then breading, battering then predusting then battering a second time then predusting a second time then battering a third time, battering then predusting then battering a second time then predusting a second time then battering a third time then breading.

The process for making a shelf stable onion product may further include causing non-intrusive oil reduction after the frying. The non-intrusive oil reduction may include holding the fried onion product to cause excess oil to drip from the fried onion product. The non-intrusive oil reduction may also include applying a flavoring to the fried onion product to cause flavorings to infuse into the fried onion product.

The process for making a shelf stable potato product may include the resulting shelf stable onion product having a fried onion portion, a batter portion, a fat content of the batter portion of about 55% to about 95% of total fat content of the shelf stable onion product, about 0% wt moisture to about 10% wt moisture, and a water activity of about 0 to about 0.6.

The fried onion portion of the resulting shelf stable onion product may include at least one member of a group comprising: a ring shape, a petal cut, a strip cut and a string cut. The fried onion portion of the resulting shelf stable onion product may be at least one member of a group comprising: an atmospheric fried onion portion and a vacuum fried onion portion.

The batter portion of the resulting shelf stable onion product may include a hardness of about 500 g to about 3000 g at a strain of about 2 mm to about 15 mm. The resulting shelf stable onion product may include a wt moisture of about 0% wt moisture to about 5% wt moisture. The resulting shelf stable onion product may include a wt moisture of about 0% wt moisture to about 3% wt moisture. The resulting shelf stable onion product may include a water activity is about 0 to about 0.4.

C. Shelf Stable Fried Product

Figure 2:
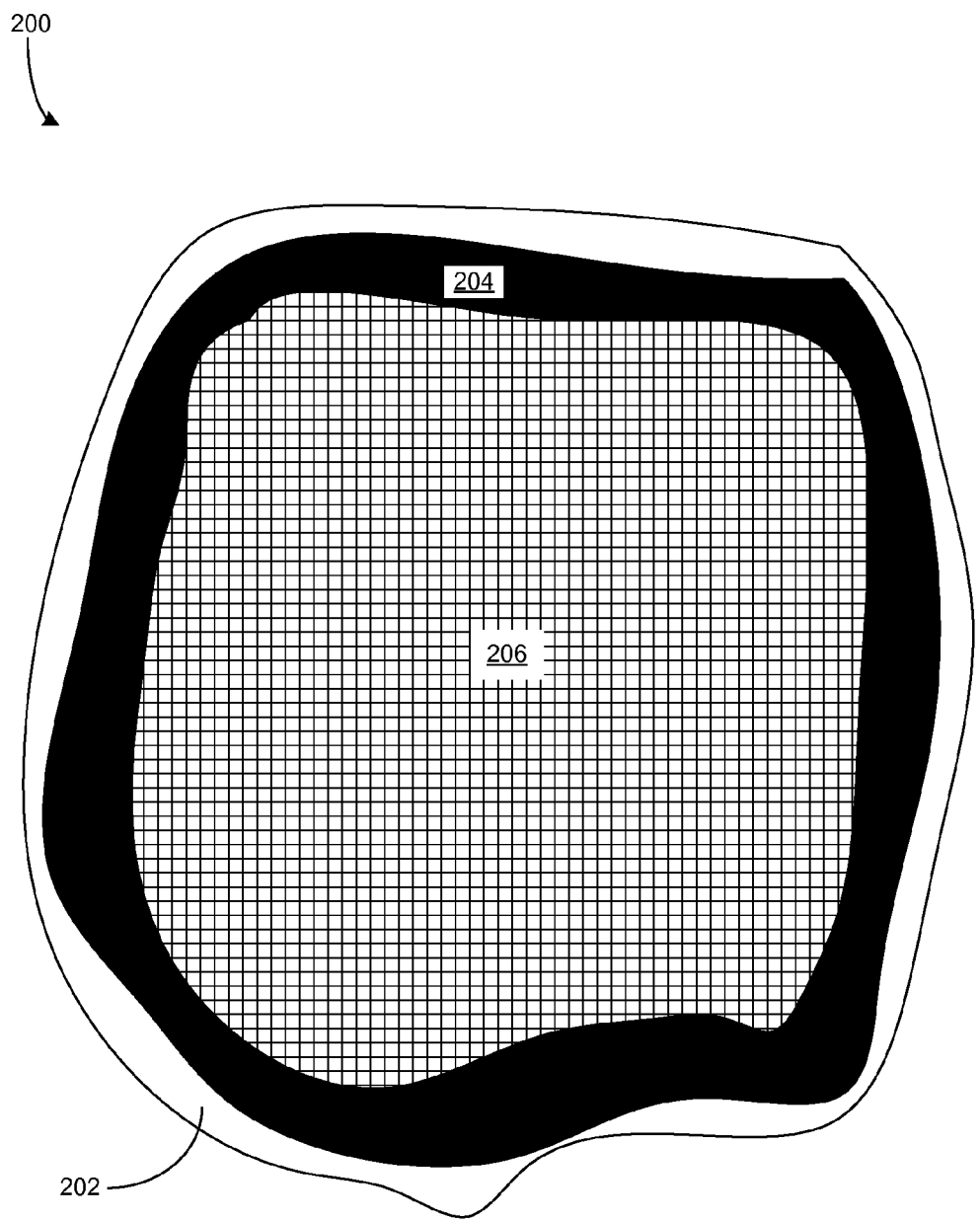
FIG. 2 is an exemplary cross section of a shelf stable fried product.

The fried products as set forth below are shelf stable, have an advantageous fat distribution and include a crispy and/or crunchy texture. The crispy and/or crunchy texture, the shelf stability, and fat distribution is facilitated by the managing of fat, moisture, and/or the internal cell structure during the creation of the product. FIG. 2 represents one possible cross-sectional illustration of fried product 200. In one exemplary aspect, FIG. 2 represents a cross-sectional illustration of a fried potato product or other product with a starchy or complex carbohydrate base. Although fried product 200 is represented in FIG. 2 as having a generally square cross-section, fried product 200 can have any shaped cross-section. For example, the shape can be generally rectangular, generally circular, generally oval, generally triangular, generally octagonal, etc. The cross-section can be a cross-section of a fried product or a portion of a fried product. For example, the cross-section can be associated with all or a portion of a fried product having a criss cut, crinkle cut, helical cut, waffle cut, lattice cut, fry cut, shoestring cut, ring cut, chip cut, etc.

Fried product 200 includes surface portion 202, primed portion 204, and inner product portion 206. Surface portion 202 can include a fat portion, a surface application portion, and/or a combination of a surface application and fat. In this example, primed portion 204 and inner portion 206 make up the food product portion (e.g., potato, sweet potato, or other product). Primed portion 204 includes a portion of solubilized complex carbohydrates generated from prime operation 112. In one aspect, the complex carbohydrates are concentrated as compared to inner product portion 206. In another aspect, primed portion 204 includes reduced simple carbohydrates as compared to inner portion 206. In another aspect, inner product portion 206 includes a higher concentration of simple carbohydrates than primed portion 204.

In another aspect, surface portion 202 and primed portion 204 may be described as the outer portion of fried product 200 and inner product portion 206 may be described as the inner portion of fried product 200. The outer portion (e.g., surface portion 202 and primed portion 204) may include a fat content of about 55% to about 95% of total fat of the fried product 200. The outer portion may include about 55%, about 60%, about 65%, about 70%, about 75%, about 80%, about 85%, about 90%, and about 95% of the total fat content of fried product 200. The fat content of the outer portion may be at least 55%, 60%, 65%, 70%, 75%, 80%, 85%, 90%, and 95% of the total fat content of fried product 200. Surface portion 202 of the outer portion can include a fat content of about 20% to about 95% of total fat of fried product 200. Surface portion 202 of the outer portion can include about 20%, about 25%, about 30%, about 35%, about 40%, about 45%, about 50%, about 55%, about 60%, about 65%, about 70%, 75%, about 80%, about 85%, about 90%, and about 95% of the total fat content of fried product 200. Surface portion 202 of the outer portion can include at least 20%, 25%, 30%, 35%, 40%, 45%, 50%, 55%, 60%, 65%, 70%, 75%, 80%, 85%, 90%, and 95% of the total fat content of fried product 200. The outer portion and the inner portion may have a fat differential between about 10% and about 90%. The outer and inner portion may have a fat differential of about 10%, about 20%, about 30%, about 40%, about 50%, about 60%, about 70%, about 80%, and about 90%. The outer portion and the inner portion may have a fat differential of at least 10%, 20%, 30%, 40%, 50%, 60%, 70%, 80%, and 90%.

The moisture content of the fried product can be between about 0.01% and about 10.0%, inclusive. The moisture content of the fried product can be below about 5%. The moisture content of the fried product can be below about 3%. The moisture content can be about 10%, about 9.5%, about 9.0%, about 8.5%, about 8.0%, about 7.5%, about 7.0%, about 6.5%, about 6.0%, about 5.5%, about 5.0%, about 5.90%, about 5.80%, about 5.70%, about 5.60%, about 5.50%, about 5.40%, about 5.30%, about 5.2%, about 5.10%, about 5.00%, about 4.90%, about 4.80%, about 4.70%, about 4.60%, about 4.50%, about 4.40%, about 4.30%, about 4.20%, about 4.10%, about 4.00%, about 3.90%, about 3.80%, about 3.70%, about 3.60%, about 3.50%, about 3.40%, about 3.30%, about 3.20%, about 3.10%, about 3.00%, about 2.90%, about 2.80%, about 2.70%, about 2.60%, about 2.50%, about 2.40%, about 2.30%, about 2.20%, about 2.10%, about 2.00%, about 1.90%, about 1.80%, about 1.70%, about 1.60%, about 1.50%, about 1.40%, about 1.30%, about 1.20%, about 1.10%, about 1.00%, about 0.90%, about 0.80%, about 0.70%, about 0.60%, about 0.50%, about 0.40%, about 0.30%, about 0.20%, or about 0.01%.

The fried product can have a water activity of between about 0.01 and about 0.6, inclusive. The water activity of the fried product can be below about 0.6. The water activity of the fried product can be about 0.01, about 0.05, about 0.10, about 0.15, about 0.20, about 0.25, about 0.30, about 0.35, about 0.40, about 0.45, about 0.50, about 0.55, and about 0.60.

The fried product can have a solids percentage of between about 90% and 99.99%, inclusive. The solids percentage of the fried product can be about 90%, about 90.5%, about 91.0%, about 91.5%, about 92.0%, about 92.5%, about 93.0%, about 93.5%, about 94.0%, about 94.5%, about 95.0%, about 95.10%, about 95.20%, about 95.30%, about 95.40%, about 95.50%, about 95.60%, about 95.70%, about 95.80%, about 95.90%, about 96.00%, about 96.10%, about 96.20%, about 96.30%, about 96.40%, about 96.50%, about 96.60%, about 96.70%, about 96.80%, about 96.90%, about 97.00%, about 97.10%, about 97.20%, about 97.30%, about 97.40%, about 97.50%, about 97.60%, about 97.70%, about 97.80%, about 97.90%, about 98.00%, about 98.10%, about 98.20%, about 98.30%, about 98.40%, about 98.50%, about 98.60%, about 98.70%, about 98.80%, about 98.90%, about 99.00%, about 99.10%, about 99.20%, about 99.30%, about 99.40%, about 99.50%, about 99.60%, about 99.70%, about 99.80%, about 99.90%, or about 99.99%.

The hardness of the fried product can include a peak force (shearing force) between about 2000 g and about 4000 g. The peak force can be about 2000 g, about 2200 g, about 2400 g, about 2600 g, about 2800 g, about 3000 g, about 3200 g, about 3400 g, about 3600 g, about 3800 g, and about 4000 g. The change in distance to peak force can be about 8 mm, about 8.5 mm, about 9.0 mm, about 9.5 mm, about 10.0 mm, about 10.5 mm, about 11.0 mm, about 11.5 mm, about 12.0 mm, about 12.5 mm, and about 13.0 mm, about 13.5 mm, about 14.0 mm, about 14.5 mm and about 15.0 mm.

The product can also have a peak force (shearing force) between about 1000 g and about 4600 g. The peak force can be about 1000 g, about 1200 g, about 1400 g, about 1600 g, about 1800 g, about 2000 g, about 2200 g, about 2400 g, about 2600 g, about 2800 g, about 3000 g, about 3200 g, about 3400 g, about 3600 g, about 3800 g, about 4000 g, about 4200 g, about 4400 g, and about 4600 g. The change in distance to peak force can be about 2 mm, about 2.5 mm, about 3.0 mm, about 3.5 mm, about 4.0 mm, about 4.5 mm, about 5.0 mm, about 5.5 mm, and about 6.0 mm.

Figure 3:
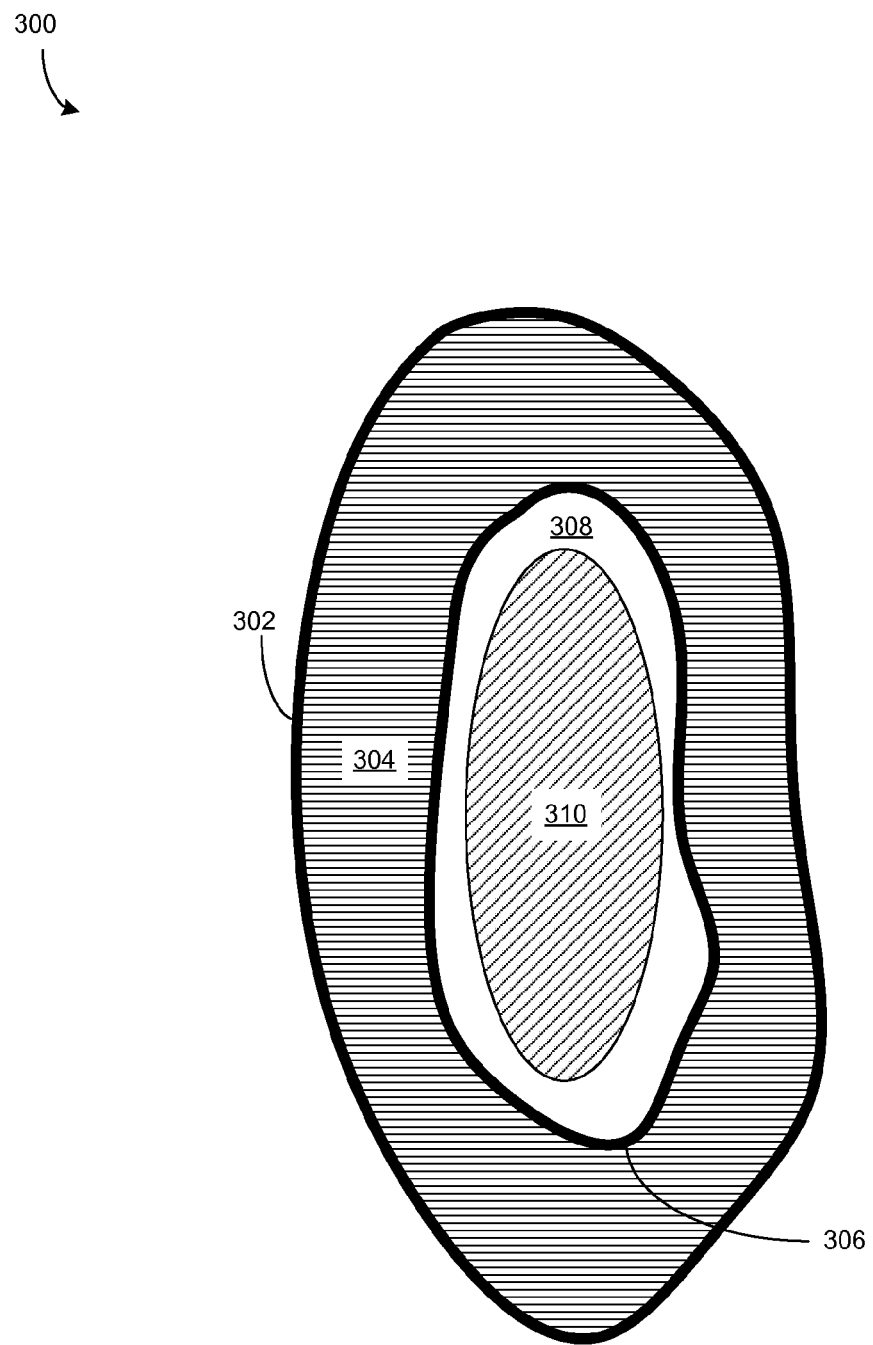
FIG. 3 is an exemplary cross section of a shelf stable fried product.

FIG. 3 represents one possible cross-sectional illustration of fried product 300. In one exemplary aspect, FIG. 3 represents a cross-sectional illustration of a fried onion product or other product with high initial moisture content or a simple carbohydrate base. Although fried product 300 is represented in FIG. 3 as having a generally oblong cross-section, fried onion product 300 can have any shaped cross-section. For example, the shape can be generally rectangular, generally circular, generally oval, generally triangular, generally octagonal, etc. The cross-section can be a cross-section of a fried product or a portion of a fried product. For example, the cross-section can be associated with all or a portion of a fried product having a helical cut, ring cut, chip cut, etc.

Fried product 300 includes surface portion 302, batter portion 304, inner batter portion 306, void portion 308, and product portion 310. In one aspect, surface portion 302, batter portion 304 and inner batter portion 306 may be described as the outer portion of fried product 300. Void portion 308 and product portion 310 may be described as the inner portion of fried product 300. The outer portion (e.g., surface portion 302, batter portion 304 and inner batter portion 306) may include a fat content of about 55% to about 95% of total fat of the fried product 300. The outer portion may include about 55%, about 60%, about 65%, about 70%, about 75%, about 80%, about 85%, about 90%, and about 95% of the total fat content of fried product 300. The fat content of the outer portion may be at least 55%, 60%, 65%, 70%, 75%, 80%, 85%, 90%, and 95% of the total fat content fried product 300. Surface portion 302 of outer portion can include a fat content of about 30% to about 95% of total fat of fried product 300. Surface portion 302 of the outer portion can include about 30%, about 35%, about 40%, about 45%, about 50%, about 55%, about 60%, about 65%, about 70%, about 75%, about 80%, about 85%, about 90%, and about 95% of the total fat content of fried product 300. Surface portion 302 of the outer portion can include at least 30%, 35%, 40%, 45% 50%, 55%, 60%, 65%, 70%, 75%, 80%, 85%, 90%, and 95% of the total fat content of fried product 300. The outer portion and the inner portion may have a fat differential of about 10% to about 90%. The outer and inner portion may have a fat differential of about 10%, about 20%, about 30%, about 40%, about 50%, about 60%, about 70%, about 80%, and about 90%. The outer portion and the inner portion may have a fat differential of at least 10%, 20%, 30%, 40%, 50%, 60%, 70%, 80%, and 90%.

During the vacuum frying and/or frying operation set forth above, batter portion 304 hardens to become a crispy and/or crunchy shell. During the frying and/or vacuum frying process, the moisture content of product portion 310 is reduced which causes shrinking of product portion 310. During the frying and/or vacuum frying process, the shrinking enables at least partial separation of product portion 310 from inner batter portion 306 to create void portion 308. The management of fat in batter between batter surface portion 302 and batter portion 304, along with the creation of void portion 308, contributes to the crispy and/or crunchy texture of the end product.

The moisture content of the fried product can be between about 0.01% and about 10.0%, inclusive. The moisture content of the fried product may be below about 5%. The moisture content of the fried product may be below about 3%. The moisture content can be about 10%, about 9.5%, about 9.0%, about 8.5%, about 8.0%, about 7.5%, about 7.0%, about 6.5%, about 6.0%, about 5.5%, about 5.0%, about 5.90%, about 5.80%, about 5.70%, about 5.60%, about 5.50%, about 5.40%, about 5.30%, about 5.20%, about 5.10%, about 5.00%, about 4.90%, about 4.80%, about 4.70%, about 4.60%, about 4.50%, about 4.40%, about 4.30%, about 4.20%, about 4.10%, about 4.00%, about 3.90%, about 3.80%, about 3.70%, about 3.60%, about 3.50%, about 3.40%, about 3.30%, about 3.20%, about 3.10%, about 3.00%, about 2.90%, about 2.80%, about 2.70%, about 2.60%, about 2.50%, about 2.40%, about 2.30%, about 2.20%, about 2.10%, about 2.00%, about 1.90%, about 1.80%, about 1.70%, about 1.60%, about 1.50%, about 1.40%, about 1.30%, about 1.20%, about 1.10%, about 1.00%, about 0.90%, about 0.80%, about 0.70%, about 0.60%, about 0.50%, about 0.40%, about 0.30%, about 0.20%, or about 0.01%.

The fried product can have a water activity of between about 0.01 and about 0.6, inclusive. The water activity of the fried product can be below about 0.6. The water activity of the fried product can be about 0.01, about 0.05, about 0.10, about 0.15, about 0.20, about 0.25, about 0.30, about 0.35, about 0.40, about 0.45, about 0.50, about 0.55, and about 0.60.

The fried product can have a solids percentage of between about 90% and 99.99%, inclusive. The solids percentage of the fried product can be about 90%, about 90.5%, about 91.0%, about 91.5%, about 92.0%, about 92.5%, about 93.0%, about 93.5%, about 94.0%, about 94.5%, about 95.0%, about 95.10%, about 95.20%, about 95.30%, about 95.40%, about 95.50%, about 95.60%, about 95.70%, about 95.80%, about 95.90%, about 96.00%, about 96.10%, about 96.20%, about 96.30%, about 96.40%, about 96.50%, about 96.60%, about 96.70%, about 96.80%, about 96.90%, about 97.00%, about 97.10%, about 97.20%, about 97.30%, about 97.40%, about 97.50%, about 97.60%, about 97.70%, about 97.80%, about 97.90%, about 98.00%, about 98.10%, about 98.20%, about 98.30%, about 98.40%, about 98.50%, about 98.60%, about 98.70%, about 98.80%, about 98.90%, about 99.00%, about 99.10%, about 99.20%, about 99.30%, about 99.40%, about 99.50%, about 99.60%, about 99.70%, about 99.80%, about 99.90%, or about 99.99%.

The hardness of the fried product may have batter failure at about 500 g, about 1000 g, about 1500 g, about 2000 g, about 2500 g, about 3000 g, about 3200 g, about 3400 g, about 3600 g, about 3800 g, about 4000 g, about 4200 g, about 4400 g, about 4600 g, about 4800 g, and about 5000 g. The change in distance to peak force can be about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8 mm, about 8.5 mm, about 9.0 mm, about 9.5 mm, about 10.0 mm, about 10.5 mm, about 11.0 mm, about 11.5 mm, about 12.0 mm, about 12.5 mm, about 13.0 mm, about 13.5 mm, about 14.0 mm, about 14.5 mm and about 15.0 mm.

D. Exemplary Product Combinations

As more fully set forth below in this section, a few exemplary product combinations are discussed. The combination examples are not meant to limit the scope of the application in any manner, but are merely to provide examples of some possible attribute combinations of a product. A myriad of product attribute combinations exist depending on the starting raw product.

An aspect may include a shelf stable food product having an inner portion and an outer portion. The shelf stable food product may include a fried food portion, a surface application portion proximal a surface of the fried food portion, a fat content of the outer portion of about 55% to about 95% of total fat content of the shelf stable food product, about 0% wt moisture to about 10% wt moisture, and a water activity of about 0 to about 0.6.

The surface application portion may be on the surface of the fried food portion. The outer portion may include the surface application portion. The outer portion may also include a primed portion of the fried food portion. The surface application portion may include about 20% to about 95% of the total fat of the shelf stable food product.

The inner portion may include an unprimed portion of the fried food product and include a fat differential between the inner portion and the outer portion of about 10% to about 90%.

In another aspect, the surface application portion of the shelf stable food product may be a batter. The shelf stable food product may further include a void portion between the batter and the fried food portion. The outer portion may include the batter. The batter may also include an outer surface. The outer surface of the batter may include about 30% to about 95% of the total fat of the shelf stable food product.

In another aspect, the inner portion may include a void portion and the fried food portion and the inner portion may include a fat differential between the inner portion and the outer portion of about 10% to about 90%.

The fried food portion of the shelf stable food product may include at least one member of a group comprising: a strip cut, a shoestring cut, a criss cut, a crinkle cut, a helical cut, a waffle cut, a straight cut, a petal cut, a ring shape, and a lattice cut. In other aspects, the fried food portion of the shelf stable food product is at least one member of a group comprising: a fruit and a vegetable.

The shelf stable food product may include a hardness of about 2000 g to about 4600 g at a strain of about 8 mm to about 15 mm. The shelf stable food product may include a hardness of about 1000 g to about 4600 g at a strain of about 2 mm to about 6 mm. The surface application portion of the shelf stable food product may include a hardness of about 500 g to about 3000 g at a strain of about 5 mm to about 6 mm.

The shelf stable food product may include a wt moisture of about 0% wt moisture to about 5% wt moisture. The shelf stable food product may include a wt moisture of about 0% wt moisture to about 3% wt moisture. The shelf stable food product may include a water activity of about 0 to about 0.4.

The fried food portion of the shelf stable food product may be at least one member of a group comprising: an atmospheric fried food portion and a vacuum fried food portion. The fried food portion of the shelf stable food product may include a primed portion and an unprimed portion. The primed portion may include a concentration of complex carbohydrates in relation to the unprimed portion.

The shelf stable food product may be made by a process that includes priming a whole food piece for about 0.10 minutes to about 10 minutes to create a primed food piece, applying a surface application to the primed food piece to create a food piece having a surface application, and frying the food piece having the surface application in oil to create a fried food product having the wt moisture. The frying may include at least one member of a group comprising: atmospheric frying and vacuum frying. The product may be further made by packaging the fried food product in a package having reduced atmospheric oxygen levels.

The shelf stable food product may be made by a process that includes applying a surface application to a food piece to create a food piece having a surface application, and frying the food piece having the surface application in oil to create a fried food product having the fat content of the outer portion of about 55% to about 95% of total fat content of the shelf stable food product. The product may be further made by freezing the food piece having a surface application. The freezing may include freezing the food piece having a surface application at sub-zero temperatures. The frying may include at least one member of a group comprising: atmospheric frying and vacuum frying. The product may be further made by packaging the fried food product in a package having reduced atmospheric oxygen levels.

An aspect may also include a shelf stable potato product having an inner portion and an outer portion. The shelf stable potato product may include a fried potato portion, a surface application portion on a surface of the fried potato portion, a fat content of the outer portion of about 55% to about 95% of the total fat of the shelf stable potato product, about 0% wt moisture to about 10% wt moisture, and a water activity of about 0 to about 0.6.

The outer portion of the shelf stable potato product may include the surface application portion. The outer portion of the shelf stable potato product may also include a primed portion of the fried potato portion. The surface application portion of the shelf stable potato product may include about 20% to about 95% of the total fat of the shelf stable potato product.

The inner portion of the shelf stable potato product may include an unprimed portion of the fried potato product and include a fat differential between the inner portion and the outer portion of about 10% to about 90%.

The fried potato portion of the shelf stable potato product may include at least one member of a group comprising: a strip cut, a shoestring cut, a criss cut, a crinkle cut, a helical cut, a waffle cut, a straight cut, and a lattice cut. The fried potato portion of the shelf stable potato product may include at least one member of a group comprising: a Russet potato piece, a Goldrush potato piece, a White potato piece, a Red potato piece, a Yellow potato piece, a Ruby potato piece, an Australian potato piece, a Yukon potato piece, a Peruvian Blue potato piece, a Superior potato piece, a Kennebec potato piece, a Katchdin potato piece, a New potato piece, and a Sweet potato piece. The fried potato portion of the shelf stable potato product may include at least one member of a group comprising: an atmospheric fried potato portion and a vacuum fried potato portion. The fried potato portion of the shelf stable potato product may include a concentration of complex carbohydrates in relation to an unprimed portion.

The shelf stable potato product may include a hardness of about 2000 g to about 4000 g at a strain of about 8 mm to about 15 mm. The shelf stable potato product may include a hardness of about 1000 g to about 4600 g at a strain of about 2 mm to about 6 mm.

The shelf stable potato product may include a wt moisture of about 0% wt moisture to about 5% wt moisture. The shelf stable potato product may include a wt moisture of about 0% wt moisture to about 3% wt moisture. The water activity of the shelf stable potato product may be about 0 to about 0.4.

The shelf stable potato product may be made by a process that includes priming a whole potato piece for about 0.10 minutes to about 10 minutes to create a primed potato piece, applying a surface application to the primed potato piece to create a potato piece having a surface application, and frying the potato piece having the surface application in oil to create a fried potato product having the wt moisture. The frying may include at least one member of a group comprising: atmospheric frying and vacuum frying. The shelf stable potato product may be further made by packaging the fried potato product in a package having reduced atmospheric oxygen levels.

An aspect may also include a shelf stable onion product having an inner portion and an outer portion. The shelf stable onion product may include a fried onion portion, a batter portion, a void portion between the batter portion and the fried onion portion, a fat content of the outer portion of about 55% to about 95% of total fat content of the shelf stable onion product, about 0% wt moisture to about 10% wt moisture, and a water activity of about 0 to about 0.6.

The outer portion of the shelf stable onion product may include the batter portion. The batter portion may include an outer surface. The outer surface of the batter portion may include about 30% to about 95% of the total fat of the shelf stable onion product.

The inner portion of the shelf stable onion product may include the void portion and the fried onion portion. The shelf stable onion product may include a fat differential between the inner portion and the outer portion of about 10% to about 90%.

The fried onion portion of the shelf stable onion product may include at least one member of a group comprising: a ring shape, a petal cut, a strip cut and a string cut. The fried onion portion of the shelf stable onion product may include at least one member of a group comprising: an atmospheric fried onion portion and a vacuum fried onion portion.

The batter portion of the shelf stable onion product may include a hardness of about 500 g to about 3000 g at a strain of about 2 mm to about 15 mm. The shelf stable onion may include a wt moisture of about 0% wt moisture to about 5% wt moisture. The shelf stable onion product may include a wt moisture of about 0% wt moisture to about 3% wt moisture. The shelf stable onion product may include a water activity is about 0 to about 0.4.

The shelf stable onion product may be made by a process that includes applying a batter to an onion piece to create an onion piece having a batter, and frying the onion piece having the batter in oil to create a fried onion product having the void portion and a fat content of the outer portion of about 55% to about 95% of total fat content of the shelf stable onion product. The frying may include at least one member of a group comprising: atmospheric frying and vacuum frying.

The shelf stable onion product may be further made by a process that includes freezing the onion piece having the batter. The freezing may include freezing the onion piece having the batter at sub-zero temperatures. The shelf stable onion product may be further made by a process that includes packaging the fried onion product in a package having reduced atmospheric oxygen levels.

E. Tested Examples

As more fully set forth below in this section, a few tested examples are disclosed. The product was made according to the process indicated. Samples from the product made according to the indicated process were then tested. The examples are not meant to limit the scope of the application in any manner, but are merely to provide a few examples of tests performed on end products made according to the indicated process.

EXAMPLE 1

Whole unpeeled Russet potatoes were sized to the desired raw diameter (1⅞ inch by 3 inch cross-sections). The sized potatoes were washed and trimmed. The washed potatoes were tempered at a temperature of about 130° F. for about 30 minutes. The tempered potatoes were mechanically cut into the desired criss cut with a thickness of about 0.312 inches. The criss cuts were graded and sorted. The graded and sorted criss cuts were primed in hot water at about 170° F. for about 5 minutes. The criss cuts were removed from the prime water and dipped in a solution of about 0.75% by weight Sodium Acid Pyrophosphate for about 30 seconds.

The treated criss cuts were dried at about 180° F. until about 12% moisture was removed. The dried criss cuts were battered and fried in hot oil at about 375° F. for about 35 seconds at atmospheric pressure. The strips were quick frozen in sub-zero air at about 0° F.

The frozen criss cuts were fried under vacuum (about 28.5 inches of mercury) in the oil at a start temperature of about 240° F. and a sustainable fry temperature of about 220° F. for about 18 minutes. The vacuum was maintained in the frying chamber while the criss cuts were introduced into the oil, immersed in the oil, and removed from the oil. The criss cuts were allowed to drip off oil for about 3 minutes while held under the vacuum after being removed from the oil. The strips then were removed from the frying chamber. The strips were then packaged.

Random samples were taken from the packaged product to test the attributes of the product. Three random samples were taken from the packaged product and the moisture content was tested. The three random samples were weighted and then dried in a moisture dish at a temperature of about 100° C. until a constant weight was obtained. The dried samples were then compared to the initial weight to determine the moisture content. The samples include a moisture content of 2.0 g, 2.0 g, and 2.0 g, respectively. The average moisture content was 2.0 g.

Three random samples were taken from the packaged product and the water activity was tested. The bottom of aw-cells were covered with a layer of each sample and measured for water activity using a Novasina aw-centre and aw-box. The samples included a water activity of 0.116. 0.117, and 0.105, respectively. The average water activity was 0.113.

The textural properties of the product were measured on a Stable Micro Systems Texture Analyzer TA.XT plus. The test was run on 15 random samples from the packaged product. A Fracture Wedge Set rig was utilized with the Stable Micro Systems Analyzer TA.XT plus. The analyzer had a test speed of 2 mm/s and a post-test speed of 10 mm/s. The peak force of the product was typically between 2000 g and 4000 g. The distance to the peak force of the product was typically between 10 mm and 15 mm.

The fat content and fat distribution of the product was tested. Three random packaged product samples were tested for total fat content. The total fat content was carried out by acid hydrolysis based on a Weibull/Berntrop method. A weight of a crushed sample was refluxed with a hydrochloric acid solution. The residue was washed through a filter paper with the acid being removed by washing with warm water. The filter paper and contents were dried and placed in an extraction thimble in a Bolton extraction tube. The fat was washed into a weighted flask by refluxing with a 50:50 mixture of diethyl ether and petroleum ether at 40-60° C. The solvent was removed and the fat dried to a constant weight. The product samples included a total fat of 31.2 g, 30.7 g, and 30.8 grams, respectively. The average total fat was 30.9 g.

About 10 g of uncrushed product samples were tested for surface fat content. The product samples were weighted into a wide necked flask. 100 ml of petroleum ether at 40-60° C. was added to the flask. The flask was sealed with foil and Para film. The flask was then swirled for 2 minutes by hand. 50 ml of solvent was then placed into a weighted metal dish. The solvent was allowed to evaporate in a fume cupboard and the dish and fat was dried in an oven at 102-103° C. for 1 hour. Once cooled, the fat was weighted. The samples had a surface fat content of 15.5 g, 14.8 g, and 15.7 g, respectively. The average surface fat content was 15.3 g or 46% of the total fat.

The fat distribution throughout the product was measured. The samples were cross-sectioned. The cross-sectioned sample was fixed in osmium vapor over silica gel to bind the osmium to the fat within the product. The cross-sectioned product was viewed by a backscattered electron detection microscope. The fat bound with osmium appeared white in the images while the remaining portions of the product unbound by the osmium appeared black. A line scan was taken through the image of the cross section and the light refraction was calculated using software. The line scan of the light refraction was plotted on a bar graph having a light refraction value (detection of fat) across the distance of the line scan. At least about 55% of the total fat of the product resided in the outer portion of the product.

EXAMPLE 2

Whole unpeeled onions were washed and sliced into the desired raw cut (⅜ inch wide rings). The slices then underwent priming at a temperature of about 95° F. for about 1 minute. The separated rings were then battered, predusted, and then battered again. The rings were then fried in oil at about 385° F. for about 35 seconds at atmospheric pressure. The fried rings were cooled to a product temperature of about 100-140° F. The rings then were quick frozen for about 15 minutes at subzero temperatures.

The rings were vacuum fried in hot oil with a starting temperature of about 240° F. and a sustainable fry temperature of about 222° F. The rings were in the vacuum fryer for about 18 minutes. The vacuum frying chamber was held at about 28.5 inches of Hg vacuum before the rings were introduced into the oil, while they were in the oil, and while they were removed from the oil. The rings were removed from the oil and allowed to drip for about 3 minutes while under about 28.5 inches of Hg vacuum. The rings then were removed from the vacuum. The rings had the desired crispy and/or crunchy texture without the undesirable hard or brittle texture.

Random samples were taken from the packaged product to test the attributes of the product. Three random samples were taken from the packaged product and the moisture content was tested. The three random samples were weighted and then dried in a moisture dish at a temperature of about 100° C. until a constant weight was obtained. The dried samples were then compared to the initial weight to determine the moisture content. The samples include a moisture content of 2.8 g, 3.0 g, and 2.8 g, respectively. The average moisture content was 2.87 g.

Three random samples were taken from the packaged product and the water activity was tested. The bottom of aw-cells were covered with a layer of each sample and measured for water activity using a Novasina aw-centre and aw-box. The samples included a water activity of 0.171., 0.169, and 0.146, respectively. The average water activity was 0.162.

The textural properties of the product were measured on a Stable Micro Systems Texture Analyzer TA.XT plus. The test was run on 15 random samples from the packaged product. A Volodkevich Bit Jaw rig was utilized with the Stable Micro Systems Analyzer TA.XT plus. The analyzer had a test speed of 2 mm/s and a post-test speed of 10 mm/s. The peak force of the product was typically between 500 g and 3000 g. The distance to the peak force of the product was typically between 2 mm and 15 mm.

The fat content and fat distribution of the product was tested. Three random packaged product samples were tested for total fat content. The total fat content was carried out by acid hydrolysis based on a Weibull/Berntrop method. A weight of a crushed sample was refluxed with a hydrochloric acid solution. The residue was washed through a filter paper with the acid being removed by washing with warm water. The filter paper and contents were dried and placed in an extraction thimble in a Bolton extraction tube. The fat was washed into a weighted flask by refluxing with a 50:50 mixture of diethyl ether and petroleum ether at 40-60° C. The solvent was removed and the fat dried to a constant weight. The product samples included a total fat of 31.0 g, 31.5 g, and 31.5 grams, respectively. The average total fat was 31.3 g.

About 10 g of uncrushed product samples were tested for surface fat content. The product samples were weighted into a wide necked flask. 100 ml of petroleum ether at 40-60° C. was added to the flask. The flask was sealed with foil and Para film. The flask was then swirled for 2 minutes by hand. 50 ml of solvent was then placed into a weighted metal dish. The solvent was allowed to evaporate in a fume cupboard and the dish and fat was dried in an oven at 102-103° C. for 1 hour. Once cooled, the fat was weighted. The samples had a surface fat content of 12.1 g, 12.3 g, and 12.7 g, respectively. The average surface fat content was 12.4 g or 39.5% of the total fat.

The fat distribution throughout the product was measured. The samples were cross-sectioned. The cross-sectioned sample was fixed in osmium vapor over silica gel to bind the osmium to the fat within the product. The cross-sectioned product was viewed by a backscattered electron detection microscope. The fat bound with osmium appeared white in the images while the remaining portions of the product unbound by the osmium appeared black. A line scan was taken through the image of the cross section and the light refraction was calculated using software. The line scan of the light refraction was plotted on a bar graph having a light refraction value (detection of fat) across the distance of the line scan. At least about 55% of the total fat of the product resided in the outer portion of the product.

EXAMPLE 3

Whole unpeeled sweet potatoes were washed and peeled. The washed potatoes were tempered at a temperature of about 130° F. for about 40 minutes. The tempered sweet potatoes were mechanically sliced into the desired cut (about 0.312 by 0.312 inch cross-section strips) with a length of at about 5 inches. The strips were then graded and sorted. The graded and sorted strips were primed in hot water at about 190° F. for about 2 minutes. The primed strips were removed from the prime water and dipped in a solution of about 0.75% by weight Sodium Acid Pyrophosphate for about 30 seconds.

The treated strips were dried at about 180° F. until about 16% moisture was removed. The strips were battered with and fried in hot oil at about 375° F. for about 35 seconds at atmospheric pressure. The strips then were quick frozen at sub-zero temperatures.

The frozen strips then were fried under vacuum (about 28.5 inches of mercury) in the oil at a start temperature of about 240° F. and a sustainable fry temperature of about 220° F. for about 22 minutes. The vacuum was maintained in the frying chamber while the strips were introduced into the oil, immersed in the oil, and removed from the oil. The strips were allowed to drip off oil for about 3 minutes while held under the vacuum after being removed from the oil. The strips then were removed from the frying chamber. The strips were then packaged.

Random samples were taken from the packaged product to test the attributes of the product. Three random samples were taken from the packaged product and the moisture content was tested. The three random samples were weighted and then dried in a moisture dish at a temperature of about 100° C. until a constant weight was obtained. The dried samples were then compared to the initial weight to determine the moisture content. The samples include a moisture content of 2.0 g, 1.9 g, and 1.8 g, respectively. The average moisture content was 1.9 g.

Three random samples were taken from the packaged product and the water activity was tested. The bottom of aw-cells were covered with a layer of each sample and measured for water activity using a Novasina aw-centre and aw-box. The samples included a water activity of 0.194., 0.192, and 0.191, respectively. The average water activity was 0.192.

The textural properties of the product were measured on a Stable Micro Systems Texture Analyzer TA.XT plus. The test was run on 15 random samples from the packaged product. A Volodkevich Bit Jaw rig was utilized with the Stable Micro Systems Analyzer TA.XT plus. The analyzer had a test speed of 2 mm/s and a post-test speed of 10 mm/s. The peak force of the product was typically between 1000 g and 4500 g. The distance to the peak force of the product was typically between 2 mm and 6 mm.

The fat content and fat distribution of the product was tested. Three random packaged product samples were tested for total fat content. The total fat content was carried out by acid hydrolysis based on a Weibull/Berntrop method. A weight of a crushed sample was refluxed with a hydrochloric acid solution. The residue was washed through a filter paper with the acid being removed by washing with warm water. The filter paper and contents were dried and placed in an extraction thimble in a Bolton extraction tube. The fat was washed into a weighted flask by refluxing with a 50:50 mixture of diethyl ether and petroleum ether at 40-60° C. The solvent was removed and the fat dried to a constant weight. The product samples included a total fat of 36.0 g, 38.5 g, and 36.4 grams, respectively. The average total fat was 36.9 g.

About 10 g of uncrushed product samples were tested for surface fat content. The product samples were weighted into a wide necked flask. 100 ml of petroleum ether at 40-60° C. was added to the flask. The flask was sealed with foil and Para film. The flask was then swirled for 2 minutes by hand. 50 ml of solvent was then placed into a weighted metal dish. The solvent was allowed to evaporate in a fume cupboard and the dish and fat was dried in an oven at 102-103° C. for 1 hour. Once cooled, the fat was weighted. The samples had a surface fat content of 8.9 g, 7.7 g, and 9.1 g, respectively. The average surface fat content was 8.6 g or 23% of the total fat.

The fat distribution throughout the product was measured. The samples were cross-sectioned. The cross-sectioned sample was fixed in osmium vapor over silica gel to bind the osmium to the fat within the product. The cross-sectioned product was viewed by a backscattered electron detection microscope. The fat bound with osmium appeared white in the images while the remaining portions of the product unbound by the osmium appeared black. A line scan was taken through the image of the cross section and the light refraction was calculated using software. The line scan of the light refraction was plotted on a bar graph having a light refraction value (detection of fat) across the distance of the line scan. At least about 55% of the total fat of the product resided in the outer portion of the product.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A packaged shelf stable potato product which is ready-for-consumption from a package without cooking or thawing preparation, the packaged shelf stable potato product having an inner portion and an outer portion, the shelf stable potato product comprising:
    a fried potato portion having a thickness of about 0.25 inches to about 0.50 inches;
    a surface application portion proximal a surface of the fried potato portion;
    a fat content of the outer portion of about 55% to about 95% of total fat content of the packaged shelf stable potato product which is ready-for-consumption from the package without cooking or thawing preparation;
    about 0% wt moisture to about 5% wt moisture of the packaged shelf stable potato product which is ready-for-consumption from the package without-preparation;
    a water activity of about 0 to about 0.6 of the packaged shelf stable potato product which is ready-for-consumption from the package without-cooking or thawing preparation; and
    a hardness of about 1000 g to about 4600 g of the packaged shelf stable potato product which is ready-for-consumption from the package without-cooking or thawing preparation.

2. The packaged shelf stable potato product of claim 1, wherein the fried potato portion includes at least one member of a group comprising: a strip cut, a shoestring cut, a criss cut, a crinkle cut, a helical cut, a waffle cut, a straight cut, and a lattice cut.

3. The packaged shelf stable potato product of claims 1, wherein the fried potato portion is at least one member of a group comprising: a Russet potato piece, a Goldrush potato piece, a White potato piece, a Red potato piece, a Yellow potato piece, a Ruby potato piece, an Australian potato piece, a Yukon potato piece, a Peruvian Blue potato piece, a Superior potato piece, a Kennebec potato piece, a Katchdin potato piece, a New potato piece, and a Sweet potato piece.

4. The packaged shelf stable potato product of claim 1, wherein the hardness is about 2000 g to about 4000 g at a strain of about 10 mm to about 15 mm.

5. The packaged shelf stable potato product of claim 1, wherein the hardness is about 1000 g to about 4500 g at a strain of about 2 mm to about 6 mm.

6. The packaged shelf stable potato product of claim 1, wherein the wt moisture is about 0% wt moisture to about 3% wt moisture.

7. The packaged shelf stable potato product of claim 1, wherein the water activity is about 0 to about 0.4.

8. The packaged shelf stable potato product of claim 1, wherein the fried potato portion is at least one member of a group comprising: an atmospheric fried potato portion and a vacuum fried potato portion.

9. The packaged shelf stable potato product of claim 1, wherein the fried potato portion includes a primed portion and an unprimed portion, wherein the primed portion includes a concentration of complex carbohydrates in relation to the unprimed portion.

10. The packaged shelf stable potato product of claim 1, wherein the shelf stable potato product is made by a process, comprising:
   priming a whole potato piece for about 0.10 minutes to about 10 minutes to create a primed potato piece, wherein the priming creates a primed portion of concentrated complex carbohydrates;
   applying a surface application to the primed potato piece to create a potato piece having a surface application;
   frying the potato piece having the surface application to create the fried potato product, wherein, during frying, moisture is vaporized into steam, wherein the priming portion diffuses the exit of steam through the priming portion to impede the migration of oil; and
   packaging the fried potato product in the package, the package having reduced atmospheric oxygen levels.

11. The packaged shelf stable potato product of claim 10, wherein frying includes at least one member of a group comprising: atmospheric frying and vacuum frying.

12. A process for making a packaged shelf stable potato product, the process comprising:
   cutting a potato to create a whole potato piece having a thickness of about 0.25 inches to about 0.50 inches;
   priming the whole potato piece for about 0.10 minutes to about 10 minutes to create a primed potato piece;
   applying a surface application to the primed potato piece to create a potato piece having a surface application;
   frying the potato piece having the surface application to a final moisture content of about 0% wt moisture to about 10% wt moisture to create a fried potato product; and
   packaging the fried potato product in a package having reduced atmospheric oxygen levels to create the shelf stable potato product, wherein the shelf stable potato product includes:
      a fried potato portion having a thickness of about 0.25 inches to about 0.50 inches;
      a surface application portion proximal a surface of the fried potato portion;
      a fat content of an outer portion of the shelf stable potato product of about 55% to about 95% of total fat content of the shelf stable potato product;
      the final moisture content of about 0% wt moisture to about 10% wt moisture;
      a water activity of about 0 to about 0.6; and
      a hardness of about 1000 g to about 4600 g.

13. The process of claim 12, wherein cutting the potato includes cutting the potato to have at least one member of a group comprising: a strip cut, a shoestring cut, a criss cut, a crinkle cut, a helical cut, a waffle cut, a straight cut, and a lattice cut.

14. The process of claim 12, wherein the whole potato piece is at least one member of a group comprising: a Russet potato, a Goldrush potato, a White potato, a Red potato, a Yellow potato, a Ruby potato, an Australian potato, a Yukon potato, a Peruvian Blue potato, a Superior potato, a Kennebec potato, a Katchdin potato, a New potato, and a Sweet potato.

15. The process of claim 12, further comprising applying a soak solution to the primed potato piece, wherein the soak solution includes at least one member of a group comprising: sodium acid pyrophosphate (SAPP), citric acid, sugar, salt, starch, fruit juice concentrate, vegetable juice concentrate, color, vinegar, acetic acid, flavor, acid, gum, and enzymes.

16. The process of claim 12, wherein the whole potato piece is primed at a temperature of at least one member of a group comprising: 155° F, to about 165° F, and 185° F to about 200° F.

17. The process of claim 12, wherein applying a surface application to the dried potato piece includes at least one member of a group comprising: battering, predusting then battering, battering then predusting then battering a second time, battering then predusting then battering a second time then breading, battering then predusting then battering a second time then predusting a second time then battering a third time, battering then predusting then battering a second time then predusting a second time then battering a third time then breading.

18. The process of claim 12, further comprising causing non-intrusive oil reduction after the frying, wherein non-intrusive oil reduction includes holding the fried potato product to cause excess oil to drip from the fried potato product.

19. The process of claim 18, wherein non-intrusive oil reduction further includes applying a flavoring to the fried potato product to cause flavorings to infuse into the fried potato product.

20. The process of claim 12, wherein the package includes about 0% to 5% oxygen.

21. The process of claim 12, further comprising freezing prior to frying to create a frozen potato product.

22. The process of claim 21, wherein freezing includes initially cooling to a temperature of about 40° F to about 180° F prior to freezing.

23. The process of claim 12, wherein frying includes at least one member of a group comprising: frying at atmospheric pressure and frying under a vacuum.

* * * * *